United States Patent
Klein

(10) Patent No.: US 7,353,223 B2
(45) Date of Patent: Apr. 1, 2008

(54) DIRECTED GRAPH FOR DISTRIBUTION OF TIME-CONSTRAINED DATA

(75) Inventor: Udo Klein, Maximiliansau (DE)

(73) Assignee: SAP Aktiengesellschaft, Walldurf (DE)

( * ) Notice: Subject to any disclaimer, the term of this patent is extended or adjusted under 35 U.S.C. 154(b) by 356 days.

(21) Appl. No.: 10/650,079

(22) Filed: Aug. 28, 2003

(65) Prior Publication Data
US 2005/0050012 A1 Mar. 3, 2005

(51) Int. Cl.
*G06F 17/00* (2006.01)

(52) U.S. Cl. ............... 707/4; 707/2; 707/3; 707/5; 707/6

(58) Field of Classification Search .......... 700/100; 707/100, 101, 201, 203, 4, 2, 3, 5, 6; 705/3
See application file for complete search history.

(56) References Cited

U.S. PATENT DOCUMENTS

| | | | | |
|---|---|---|---|---|
| 6,065,018 | A | 5/2000 | Beier et al. ............... | 707/202 |
| 6,112,209 | A * | 8/2000 | Gusack .................... | 707/101 |
| 6,122,649 | A | 9/2000 | Kanerva et al. .......... | 707/516 |
| 6,295,541 | B1 | 9/2001 | Bodnar et al. ........... | 707/203 |
| 6,405,218 | B1 | 6/2002 | Boothby ................... | 707/201 |
| 6,415,326 | B1 * | 7/2002 | Gupta et al. .............. | 709/231 |
| 6,449,622 | B1 | 9/2002 | LaRue et al. ............. | 707/201 |
| 6,892,210 | B1 | 5/2005 | Erickson et al. .......... | 707/201 |
| 6,925,477 | B1 | 8/2005 | Champagne et al. ..... | 707/203 |
| 2002/0156798 | A1 | 10/2002 | Larue et al. .............. | 707/201 |
| 2005/0010606 | A1 * | 1/2005 | Kaiser et al. ............. | 707/200 |
| 2005/0131925 | A1 | 6/2005 | Coker et al. .............. | 707/100 |
| 2005/0177587 | A1 | 8/2005 | Mukundan et al. ....... | 707/100 |
| 2005/0192783 | A1 * | 9/2005 | Lystad et al. ............. | 703/3 |

OTHER PUBLICATIONS

Joseph Culberson "Graph Coloring Resources" page, printed Apr. 27, 2004, Applicant believes to be prior art for purposes of examination, 3 pages.

* cited by examiner

*Primary Examiner*—Charles Rones
*Assistant Examiner*—Rezwanul Mahmood
(74) *Attorney, Agent, or Firm*—Fish & Richardson P.C.

(57) ABSTRACT

In synchronizing data across a database, time-dependent and time-constrained data may be synchronized, using grouping value(s) that may themselves be time-dependent. When a time constraint prohibits data timelines from exhibiting time gaps, data included in the timeline may be mapped to a directed graph. In this way, any time gaps may be filled by extending data records that precede the gap(s), and this operation may be reflected in a coloring of the directed graph. Then, recursive processing may be performed using the directed graph, so as to account for any unanticipated effects of the extended data records.

20 Claims, 21 Drawing Sheets

US 7,353,223 B2

DIRECTED GRAPH FOR DISTRIBUTION OF TIME-CONSTRAINED DATA

TECHNICAL FIELD

This description relates to synchronizing data.

BACKGROUND

Conventional enterprise business applications exist that, for a variety of reasons, include identical data in multiple locations. Examples of data that may appear in multiple locations include a person's name, address, and social security number. For example, some or all of this data may be included (or associated) with information about the person's compensation information, work assignment, or citizenship status.

When particular pieces or types of data are required to be consistent throughout a database system, it is generally not problematic to synchronize such data accordingly. For example, a person's name will generally be consistent throughout a database system. If the person's name changes (for example, due to marriage), then a single change is usually sufficient to accurately reflect this change throughout the database system.

Data modification may be similarly straight-forward when particular pieces or types of data are required to be consistent throughout a well-defined sub-section of a database system. For example, it may be the case that certain data, such as benefits information, should be consistent within the context of a single work assignment. If the benefits information changes (for example, when a person receives a promotion and becomes authorized to use a company car), then this information is reflected throughout the particular work assignment portion of the database system.

However, some data modifications are neither universal through the database system, nor inherently well-defined in their scope of relevance. For example, if a person has two work assignments within an enterprise, then benefits information related to the first work assignment may not be exactly identical to benefits information of the second work assignment. In the example just given, a modification of benefits information in a first work assignment to reflect authorization for use of a company car may not be identically reflected in a modification of benefits information of the second work assignment. That is, an employee generally would not have access to two company cars.

Various techniques exist for attempting to ensure that data is correct when the scope of the data is neither universal nor well-defined. For example, some applications allow manual entry of such data in all appropriate locations. Aside from difficulties related to the cost and efficiency of such an approach, difficulties may arise that are related to varying authorization levels of the data-entry technicians entering the data. That is, a particular data-entry technician may see that a certain change needs to be made, but may not have the appropriate authorization level to enter the changes in all locations.

Further, it is often the case that enterprise data is time-dependent and/or time-constrained. For example, wage information is often time-dependent, and changes over a person's term of employment. Additionally, wage information may be time-constrained, in that the database system may require that wage information always be present (that is, a person may not be on record as working in a given time period, without being paid some amount during that period).

Often, it is not satisfactory to simply change such time-dependent data when necessary; rather, the time dependent data is changed, and a record of the previous value is stored. In this way, historical data may be kept and compiled for purposes of, for example, tracking employee information over a period of time.

SUMMARY

According to one general aspect, grouping values are translated into nodes of a directed graph, wherein the grouping values are associated with periods of timelines, the timelines comprising data records. Data is distributed through the nodes to obtain a modified subset of the data records, the data is re-distributed recursively along the nodes to obtain a modified directed graph, and the modified directed graph is translated into a modified plurality of timelines that include the modified subset of data records.

Implementations may have one or more of the following features. For example, the data records may be subject to a time constraint such that temporal gaps between the data records are not allowed, and the modified subset of data records may be in compliance with the time constraint.

A data record preceding a temporary gap between data records caused by a modification of the data records may be extended through the temporary gap to a next-occurring data record. In translating sequences of grouping values, identical grouping values may be assigned to a single node, and edges of the directed graph may be inserted between pairs of nodes that correspond to consecutively-occurring ones of the periods. In this case, a node of the directed graph may be represented based on a grouping value and beginning point of an associated one of the periods.

In distributing data through the nodes, each grouping value and its associated period may be assigned an assigned color, and each node may be colored its assigned color to represent data, so that nodes having identical color share identical data. In re-distributing the data, data records of a first timeline and a second timeline from the plurality of timelines may be associated with a first grouping value, and the data records may be synchronized.

In distributing data, a node may be removed from the directed graph that corresponds to a timeline period that is associated with a data record having data at its beginning. Also, the directed graph may be traversed and consecutive nodes may be designated identically so as to represent identical data stored in association with the grouping values represented by the consecutive nodes, and the traversing may be stopped upon reaching a differently-designated node.

According to another general aspect, an apparatus includes a storage medium having instructions stored thereon. The instructions include a first code segment for selecting a first grouping value sequence associated with a first timeline, the first timeline including first data records, a second code segment for selecting a second grouping value sequence associated with a second timeline, the second timeline including second data records, a third code segment for mapping the first grouping value sequence and the second grouping value sequence into nodes of a directed graph, and a fourth code segment for representing data associated with a first grouping value in the directed graph by providing a first designation to a first node associated with the first grouping value.

Implementations may have one or more of the following features. For example, the first data records and second data records may be subject to a time constraint such that no gap is allowed between any two of the first data records and second data records. In this case, a fifth code segment may included for extending a data record that precedes a gap in its associated timeline, in violation of the time constraint, until the data record meets a succeeding data record.

Also, a fifth code segment may be included for recursively distributing data through the directed graph in response to a modification of one of the first data records, beginning with a high date of the first timeline and the second timeline, to ensure that all of the first and second data records are in accordance with the time constraint. In this case, a sixth code segment may included for mapping the directed graph into a modified first timeline and a modified second timeline.

Each grouping value may be associated with a time period, and identical data may appear in the first timeline and the second timeline whenever a grouping value and period overlap. A fifth code segment may be included for assigning identical grouping values to a single node of the directed graph, and a sixth code segment may be included for inserting edges of the directed graph between pairs of nodes that correspond to consecutively-occurring ones of grouping values from the first grouping value sequence and the second grouping value sequence.

A fifth code segment may be included for removing a node from the directed graph that corresponds to a timeline period that is associated with a data record having data at its beginning. Also, a fifth code segment may be included for traversing the directed graph and designating consecutive nodes identically so as to represent identical data stored in association with the grouping values represented by the consecutive nodes, and a sixth code segment may be included for stopping the traversing upon reaching a differently-designated node.

According to another general aspect, a system may include means for associating nodes of a directed graph with grouping periods and grouping values associated with timelines, means for associating an edge of the directed graph between succeeding grouping periods, and means for distributing data associated with the timelines by operating on the directed graph, and thereafter translating the directed graph back into the timeliness Implementations may have one or more of the following features. For example, the timelines may comprise data records that are subject to a time constraint such that no temporal gap is allowed to exist between any two of the data records. The system may include means for designating nodes of the directed graph as corresponding to grouping periods containing data. A grouping period and a grouping value may be associated with identical data of the timelines.

The details of one or more implementations are set forth in the accompanying drawings and the description below. Other features will be apparent from the description and drawings, and from the claims.

DETAILED DESCRIPTION

Figure 1:
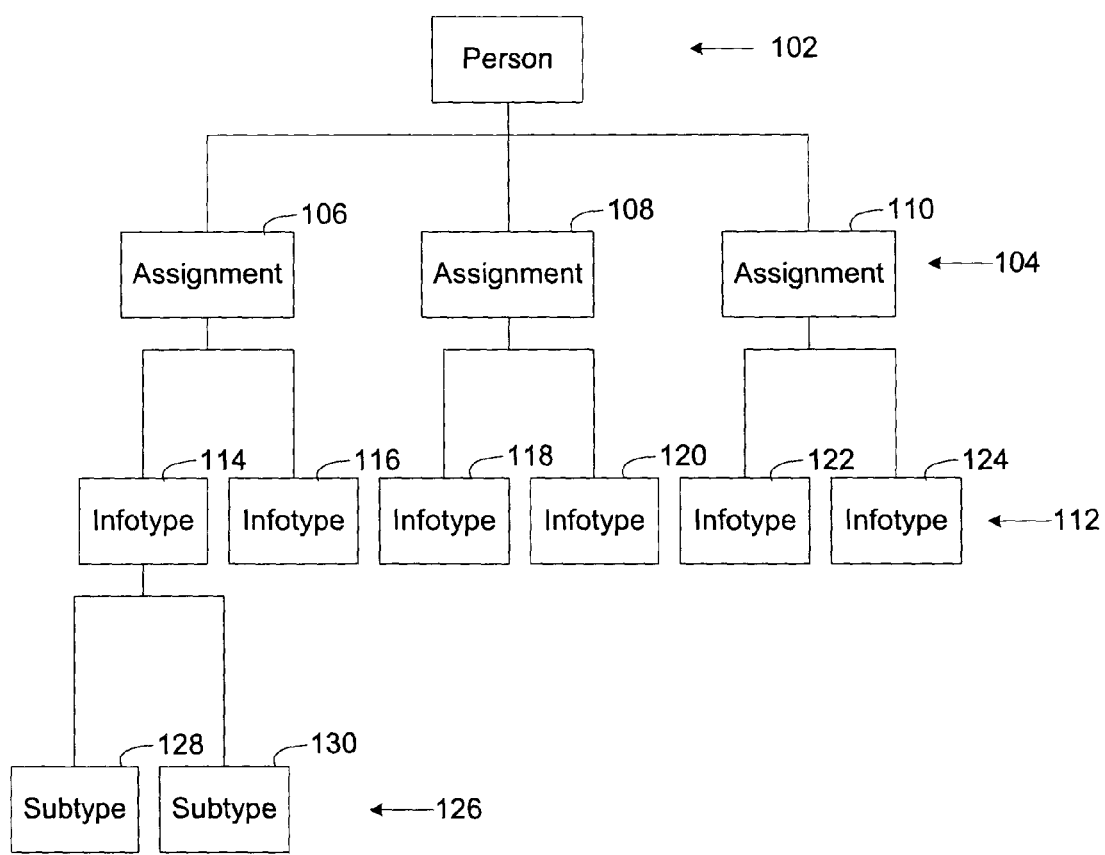
FIG. 1 is a block diagram of a data model.

FIG. 1 is a block diagram of a data model 100. In FIG. 1, a first level 102 contains data related to a particular person. Data stored in (or directly relevant to) this level may be shared universally wherever information about the particular person appears. Such data may include, for example, the person's name, gender, or marital status. The person at the level 102 may be associated with a unique employee number, so that the person-level data may be shared wherever the unique employee number appears.

A second level 104 includes information related to particular work assignments associated with the person referenced in the level 102. For example, a nurse may have an assignment 106 at a hospital as a cardiology nurse and another assignment 108 as a pediatric nurse, and may have another assignment 110 providing homecare assistance at a clinic. The hospital and clinic may be owned and operated by the same entity, so that data related to the hospital and clinic may be shared in a single database system.

As with the level 102, a unique number may be associated with each assignment within the level 104, so that data common to a particular work assignment (e.g., the location of the clinic) may be shared within that work assignment.

A third level 112 includes particular information related to each assignment. Such information may include, for example, wage and benefits information associated with the assignment(s), as well as tax information, work schedule, and job description.

In FIG. 1, this information is illustrated as "Infotypes." Infotypes refer to groupings of related data to, for example, facilitate data entry and review. For example, an Infotype for "addresses" may group address information so that a person's street number, city and zip code may be entered in a single screen or user interface.

Such information may be common to each assignment 106, 108, 112. That is, an Infotype 114 and an Infotype 116 of the assignment 106 may correspond to an Infotype 118 and 120 of the assignment 108, respectively, and (also respectively) to an Infotype 122 and 124 of the assignment 110. For example, the Infotypes 114, 118, and 120 may be the "addresses" Infotype. As already explained, actual values for this information may, but will not necessarily, be the same within each of the Infotypes 114, 118, and 120.

An Infotype may include one or more subtypes; for example, the addresses Infotype may include a subtype for a home address, a mailing address, or a temporary residence (for example, corporate housing provided in relation to a particular work assignment). Other Infotypes may include, for example, organization assignment, basic pay, check distribution details (e.g., bank account for direct deposit of pay), or any other information grouping deemed useful for tracking employee information. Such subtypes may be part of a fourth level 126 of FIG. 1, illustrated as a subtype 128 and a subtype 130. Of course, every Infotype may have one or more subtypes, although only the two subtypes 128 and 130 are illustrated in FIG. 1, for the sake of clarity. Moreover, it should be understood that subtypes themselves may have further sub-groupings.

One example of an enterprise application(s) in which the data model 100 may be used includes a Human Resource application, as illustrated in many of the examples discussed herein. However, it should be understood that any database system may utilize the techniques discussed herein, whenever, for example, particular pieces or types of data to be shared are neither universal nor definitively-defined in their scope of relevance within the database system.

Figure 2:
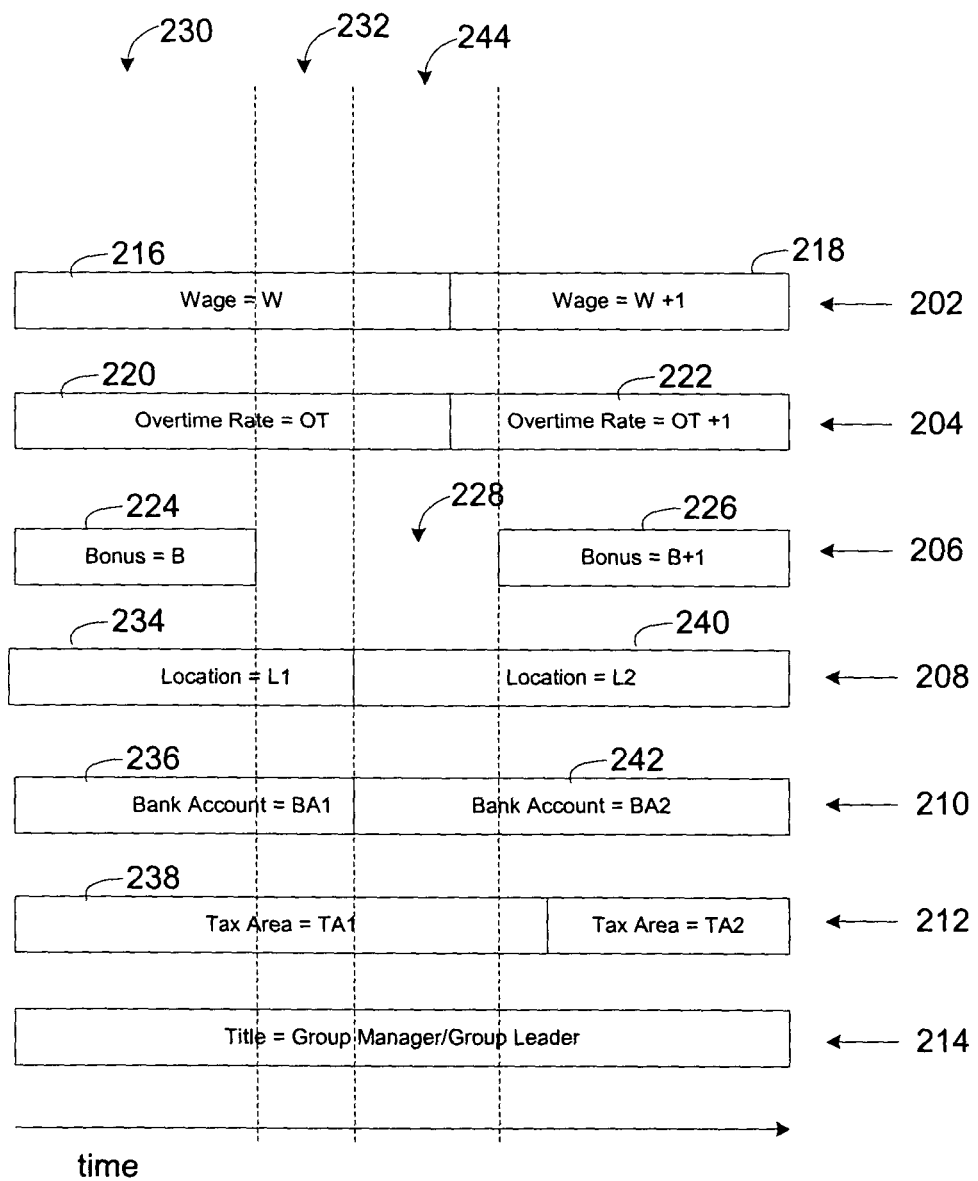
FIG. 2 illustrates timelines for data records that may be stored in the data model of FIG. 1.

FIG. 2 illustrates timelines for data records that may be stored in the data model of FIG. 1. Specifically, a timeline 202 illustrates periods of time during which an employee had (has) a given wage. Similarly, a timeline 204 illustrates periods of time during which a given overtime rate was valid, while a timeline 206 illustrates periods of time during which a given bonus structure was valid. A timeline 208 illustrates periods of time during which a given location was valid for the employee, while a timeline 210 illustrates periods of time during which a specific bank account was being used by the employee. Finally, a timeline 212 illustrates periods of time during which the employee lived in a certain tax area, and a timeline 214 illustrates periods of time during which the employee retained a certain title.

In FIG. 2, a wage record having a value "W" is associated with a period of time 216 of the timeline 202. At a given time at which the employee receives a raise in pay, the wage record is updated by, for example, a Human Resources (HR) administrator, and a new period of time 218 is defined in which the wage record has an increased value indicated by "W+1." In the following discussion, a period of time associated with a specific time line may be referred to as a "slot," so that the timeline 202 includes slots 216 and 218. In this way, a period may coincide with multiple slots on multiple timelines.

For example, the timeline 204 includes a slot 220 for an overtime record having a value "OT," as well as a slot 222 associated with the overtime record having an increased value indicated by "OT+1." Thus, the slots 220 and 216 of timelines 204 and 202, respectively, occupy the same period of time. That is, the slots have the same beginning point (e.g., date, when time is measured in days) and end point (date).

Thus, as indicated by, for example, the timelines 202 and 204, when an Infotype is updated, previous (i.e., changed) record data is typically stored for future uses, such as historical evaluations of an employee's employment record. Each Infotype may be associated with a specific period of validity, so that multiple Infotype records may be stored at the same time, even if validity periods of the records overlap. To accomplish this type of storage, and as referred to above, time relationships between Infotype records are defined according to certain time constraints.

For example, a first time constraint is referred to herein as "time constraint 1." Time constraint 1 requires that, for the entire time that an employee works at the enterprise, exactly one Infotype record must exist, so that validity periods of the individual records do not overlap. If a new record is created, the start date of the new record ends the validity of the old record.

Timelines 202 and 204 illustrate time constraint 1. That is, for a given work assignment, the employee will always have a wage, even though the value of the wage may change over time. In other words, there is no "gap" in time between wage "W" and wage "W+1." Rather, there is a "split" between the two wage values such that the two slots 216 and 218 are adjacent to one another and do not overlap. Such a split may be represented by, for example, the end date of the earlier time slot (here, slot 216). Similar comments apply to the timeline 204 associated with the overtime record.

A second time constraint is referred to as "time constraint 2." Time constraint 2 allows for only one record to exist at a time, but the existence of records under time constraint 2 is not mandatory. Creation of a new record automatically delimits the previous record (and creates a split), if one exists.

The timeline 206 illustrates time constraint 2. That is, a slot 224 represents the bonus record having a value "B," while a slot 226 represents the bonus record having the value "B+1." A gap 228 exists between the slots 224 and 226, indicating that the bonus record need not exist at any given point in time. That is, if the employee is not eligible for a bonus, or if the enterprise rescinds its bonus policy, then the bonus record may not exist at a given point in time.

A third time constraint is referred to as "time constraint 3." Time constraint 3 allows any number of valid, non-conflicting records to exist at a given time. For example, the timeline 214 illustrates a title record, and illustrates that the employee may have one or more titles at a given point in time. The different titles may reflect different duties under the work assignment, or may simply represent optional nomenclature used by the enterprise.

Other examples of time constraints include system time constraints such as "time constraint A," according to which an Infotype may have only one record, having an effectively infinite validity period (e.g., Jan. 1, 1800 to Dec. 31, 9999). The validity period may not be subdivided, and the record(s) may not ever be deleted from the system. A "time constraint B" has similar characteristics, except that it can be deleted.

It should be understood from the above description that an Infotype exists for a finite (validity) period of time, until, for example, a data record is updated. At that point, a new Infotype is created that includes the updated data record, where the remaining data records may overlap in their validity periods with the updated data record.

For example, during a time period 230, an Infotype record exists that includes the slot 224 for a bonus record having a value "B." At a point in time, the bonus record is deleted as an Infotype record, thereby defining a beginning of a new time period 232. During the time period 232, a time slot 234 for a location record having a value "L1" continues to exist, together with a time slot 236 for a bank account record having a value "BA1" and a time slot 238 for a tax area record having a value "TA1." Additionally, the corresponding values for (time slots for) the timelines 202, 204, and 214 continue to be valid, as shown.

Similarly, upon a change in value L1 of the time slot 232 to a value "location=L2" associated with a time slot 240 (as well as a corresponding change in value BA1 of the time slot 234 to a value "Bank Account=BA2" associated with a time slot 242), a new Infotype is defined that is associated with a period 244.

Time constraints as discussed above may apply to Infotypes or subtypes. For example, in one implementation, different addresses may be current at the same time, so that time constraint 3 applies to the Infotype Addresses. In this implementation, for a permanent residence, a record must always exist, so time constraint 1 would be appropriate for this subtype. Finally in this implementation, it may not be essential that a home address be maintained, but if it is, then only one may exist at any one time. As a result, time constraint 2 would be appropriate.

FIGS. 1 and 2 illustrate techniques which enable storage and maintenance of time-dependent and time-constrained data in the data model 100 of FIG. 1. It should be understood that the timelines of FIG. 2 may correspond to, for example, data records of the Infotype 114 of the assignment 106 of FIG. 1. Of course, the timelines of FIG. 2 also may correspond to multiple Infotypes, depending on how a particular enterprise defines Infotypes within their database system. For example, the timelines 202, 204, and 206 may correspond to an Infotype "pay information," while the remaining timelines correspond to one or more other Infotype(s).

In the example given above, the Infotype 114 corresponds to the cardiology assignment 106, and may contain identical data as the Infotype 118 of the pediatrics assignment 108. However, the Infotype 122 of the clinic assignment 110 may contain non-identical data. For example, the nurse may earn one wage at both of the assignments 106 and 108, while earning a different wage at the clinic assignment 110.

As a result, it should be understood that some Infotypes should be synchronized across assignments, while others should not be. The following description provides techniques for dynamically and accurately synchronizing Infotypes, where desired, in the data model 100 of FIG. 1. More specifically, the techniques synchronize Infotype records by assigning a common grouping value to specific points in time (slots), to thereby establish an equivalence relation between time slots of different timelines for the same period. As a result of this grouping technique, Infotype records may be copied, deleted, or otherwise modified such that records for equivalent (grouped) time slots contain the same data (values).

Figure 3:
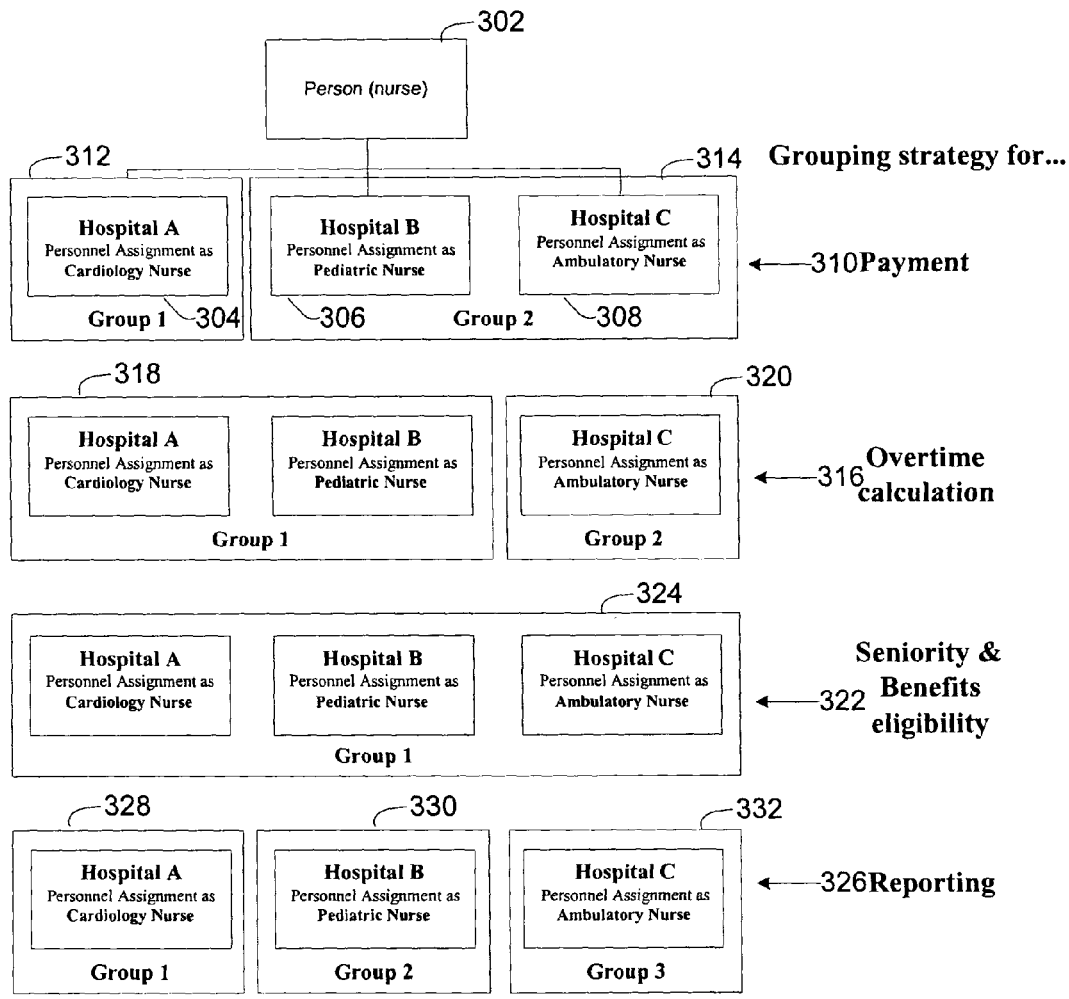
FIG. 3 is a block diagram of a grouping scenario used in the data model of FIG. 1.

FIG. 3 is a block diagram of a grouping scenario used in the data model 100 of FIG. 1. In FIG. 3, a person 302 represents a nurse practitioner. As in the examples above, the nurse 302 has three assignments. A first assignment 304 is as a cardiology nurse at a first hospital, Hospital A. A second assignment 306 is as a pediatric nurse at a second hospital, Hospital B. A third assignment 308 is as an ambulatory nurse at a third hospital, Hospital C.

In FIG. 3, a Payment Infotype 310 is grouped such that a first group 312 includes only the assignment 304, while a second group 314 includes the assignment 306 and the assignment 308. That is, the nurse 302 has the same payment (e.g., wage) information at the assignments 306 and 308, but has different payment information at the assignment 304.

Similarly, an Overtime Calculation Infotype 316 is grouped such that a first group 318 includes the assignments 304 and 306, while a second group 320 includes the assignment 308. A Seniority & Benefits Eligibility Infotype 322 is grouped such that a group 324 includes all of the assignments 304, 306, and 308. Finally, a Reporting Infotype 326 is grouped such that a first group 328 includes the assignment 304, a second group 330 includes the assignment 306, and a third group 332 includes the assignment 308.

Figure 4:
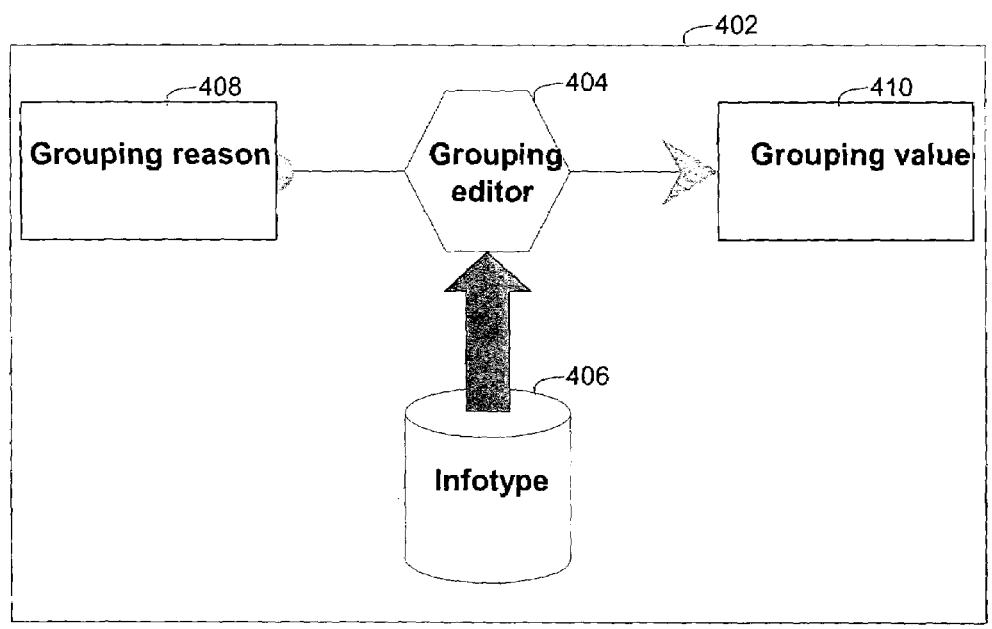
FIG. 4 is a block diagram of a grouping reader.

FIG. 4 is a block diagram of a grouping reader 402. In FIG. 4, the grouping reader 402 includes a grouping editor 404 that inputs an Infotype 406 associated with a particular assignment. The grouping editor 404 then determines a corresponding grouping reason 408, and outputs a grouping value 410. This process may be repeated for all Infotypes of all assignments, to the extent necessary to ensure all appropriate grouping values have been calculated.

A particular Infotype may be pre-associated with a particular grouping reason, although this grouping reason could be changed if desired or necessary. For example, an Address(es) Infotype may have a grouping reason "person," while a Bank Account Infotype may have a grouping reason "country." That is, addresses associated with a particular person will be the same across Address Infotypes of different assignments. Similarly, bank account information associated with a particular country will be the same across Bank Account Infotypes of different assignments. Thus, in the latter example, an employee who has two work assignments in the same country may have identical bank account information for those assignments, while a third assignment, in a second country, may have different bank account information.

In operation, the grouping editor 404 inputs a particular Infotype, such as a Bank Account Infotype, and determines a corresponding grouping reason of, in the example just given, "country." The grouping editor 404 may then associate the country for the Infotype in question (e.g., Germany) with the output grouping value 410. The grouping value 410 may be, for example, a simple character string.

The grouping editor uses grouping rules to associate different grouping reasons with particular grouping values. The grouping rules are technical descriptions characterizing a grouping, based on, for example, the relevant assignment(s) or a nature of the data to be grouped. For example, some grouping rules are not time-dependent, so that grouping values may not have splits in time. Other grouping rules are time-dependent, so that resulting grouping values may change over time, i.e., may have splits in time.

Once grouping values are determined, the database system associates the determined grouping value with, for example, every Bank Account Infotype that includes a data record for a country field having a value "Germany." If a change is made to one such Bank Account Infotype of a given assignment (for example, an account number or a preferred branch location may be changed), then that change will automatically be reflected in every grouped Bank Account Infotype of other assignments, as well.

Figure 5:
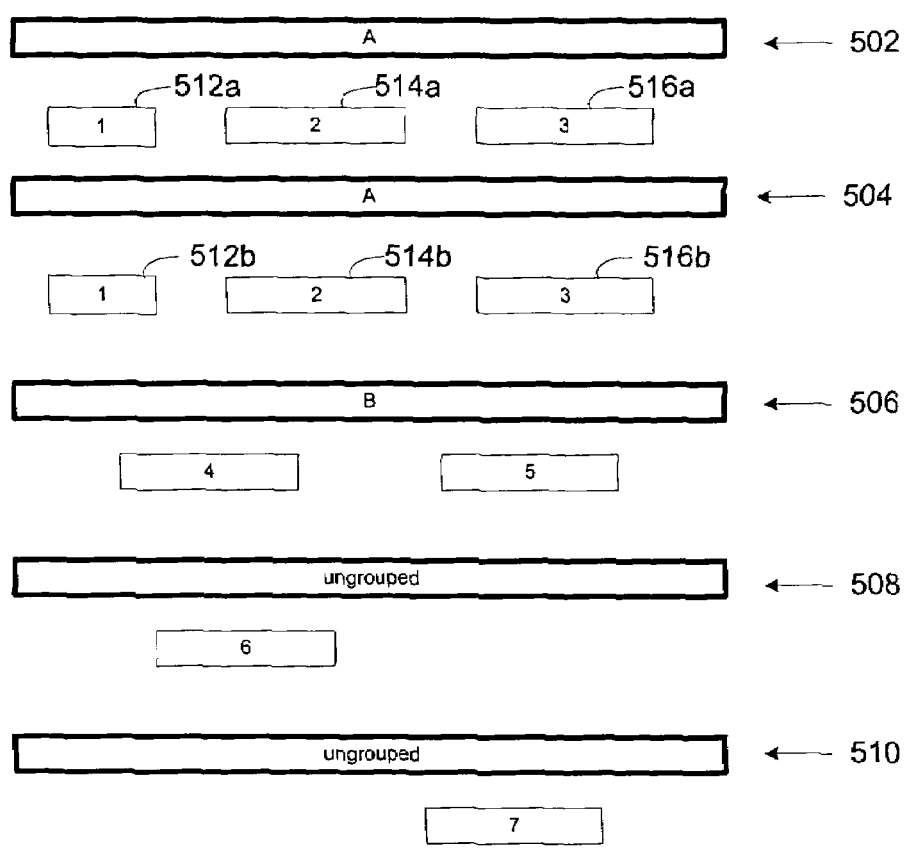
FIG. 5 is a first block diagram of timelines having different grouping values.

FIG. 5 is a first block diagram of timelines having different grouping values. Specifically, a timeline 502 and a timeline 504 have a grouping value "A," while a timeline 506 has a grouping value "B." A timeline 508 and a timeline 510 have a grouping value of "ungrouped."

Regarding the timeline 510, a value of "ungrouped" generally may result, for example, in particular situations where the employee is not fully integrated into a workforce.

An example of such a situation may be when someone is first hired, but before the person has begun work. A second example may be when an employee receives a new assignment (e.g., to a subsidiary of a current employer), but before the employee begins work there. Other examples may exist, such as when an Infotype or subtype is categorized as one that should never share data. Any such non-groupings may be referred to as ungrouped, not grouped, default grouped, or any other designated value that indicates that records in that period will not be shared.

Further in FIG. 4, individual Infotype records grouped according to the grouping value A include a record 512a and a corresponding record 512b, a record 514a and a corresponding record 514b, and a record 516a and a corresponding record 516b. Thus, any data that is in an Infotype record associated with the grouping value A is shared with all other records having the grouping value A. Records associated with the timelines 506, 508, and 510 are not copied to any other location, since they have no matching grouping value, or are ungrouped, as shown.

The records 512a, 514a, and 516a, as should be understood from the above discussion of FIG. 2, represent their own timeline. For example, the records might correspond to the bonus time line 206 of FIG. 2 and its associated bonus records stored in time slots 224 and 226.

As mentioned above, grouping rules may or may not be time-dependent. In FIG. 5, only non-time dependent grouping values are illustrated, since the grouping values A and B have no splits in time. Such grouping values are suitable for grouping assignments/Infotypes that are subject to any time constraint (e.g., time constraint 1, 2, 3, A, or B).

Figure 6:
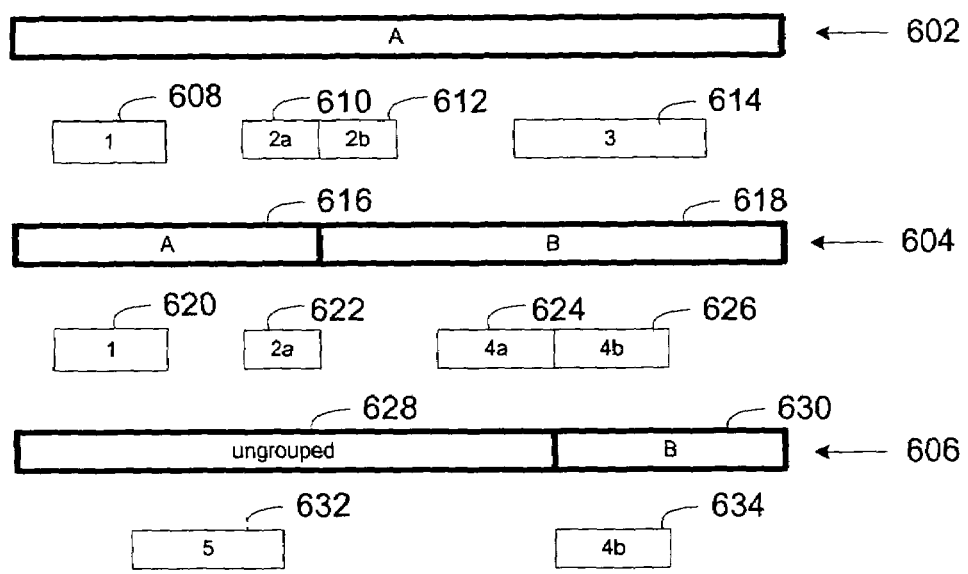
FIG. 6 is a second block diagram of timelines having different grouping values.

FIG. 6 is a second block diagram of timelines having different grouping values. In FIG. 6, time-dependent grouping is illustrated with a timeline 602, a timeline 604, and a timeline 606. The timeline 602 has a grouping value "A" throughout the time period shown, and includes a record 608, a record 610, a record 612, and a record 614.

The timeline 604 has a grouping value A for a first time period 616, until a split occurs and the grouping value changes to a value "B" in a time period 618. A record 620 and a record 622 are included in the period (slot) 616, while a record 624 and a record 626 are included in the period (slot) 618.

The timeline 606 has a grouping value "ungrouped" for a first time period 628, until a split occurs and the grouping value changes to a value "B" in a time period 630. A record 632 is included in the period (slot) 628, while a record 634 is included in the period (slot) 630.

It should be understood from FIG. 6 that data sharing is time-dependent if the assigned grouping is time dependent. Thus, data is shared if, and only if, periods are grouped. For example, the records 610 and 612 were inserted as a single record. However, only the first half of the original record matched the grouping value A during the overlap of the timeline 602 and the time slot 616. Therefore, this matching record portion is split into the records 610 and 612, and the value of the record 610 is copied to the time slot 616 as the record 622. Similar observations may be made for records 624/626 and 634.

Time dependent (split) grouping may be used for records subject to time constraints 1 or 2, and, in some circumstances, time constraint 3. However, such grouping is typically not appropriate for time constraint A or B, since, in those cases, it is unclear how a split in grouping values would be reflected in the records themselves.

Figure 7:
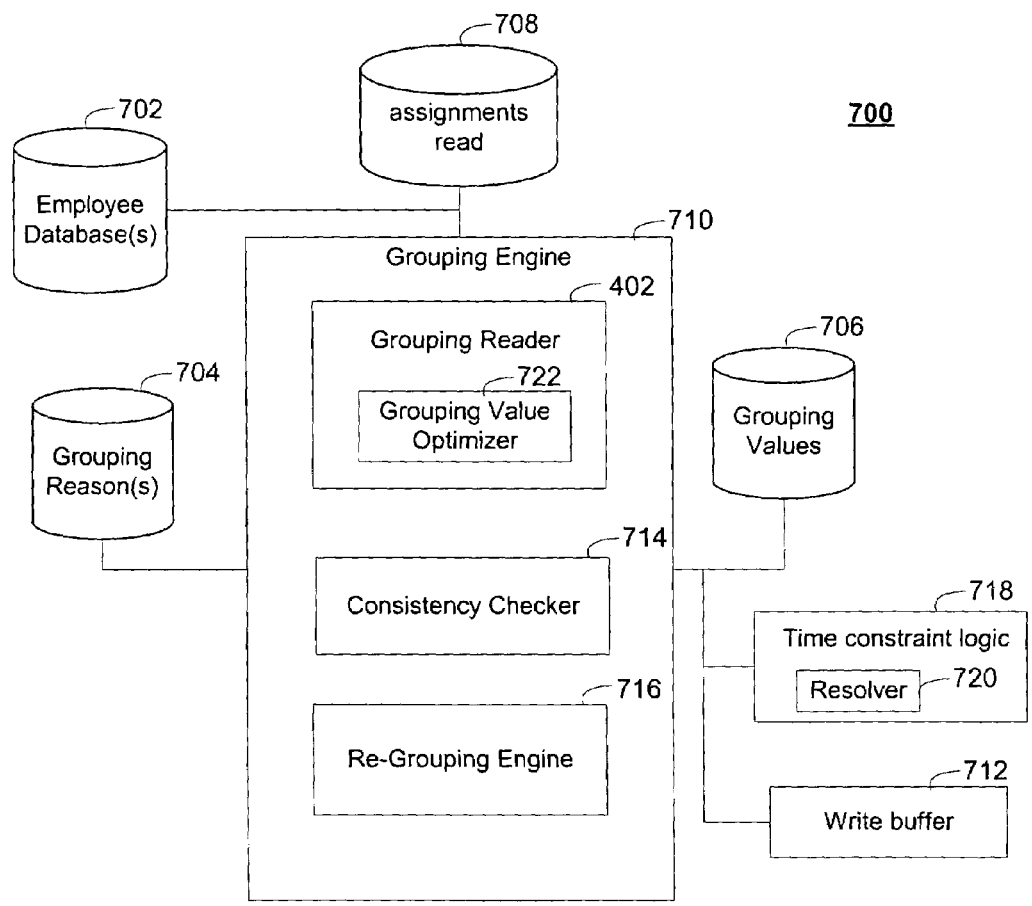
FIG. 7 is a block diagram of a data synchronization system.

FIG. 7 is a block diagram of a data synchronization system 700. The system 700 includes the grouping reader 402, which, as explained above with respect to FIG. 4, inputs information such as assignments (e.g., the unique identification number associated with each assignment), Infotypes, subtypes, and other employee information from an employee database(s) 702. The grouping reader 402 further inputs grouping reasons from a table 704, and outputs grouping values to a table 706. The grouping reader outputs a list of assignment(s) (identification numbers) that have already been read for a particular employee in a table 708.

A grouping engine 710 accesses the grouping reader 402 and/or the grouping values table 706 and outputs synchronized data to a write buffer 712. More specifically, the grouping engine 710 includes a consistency checker 714 that ensures that data is appropriately consistent across grouped assignments/Infotypes/subtypes, as well as a re-grouping engine 716 that is operable to re-group data after a change in grouping values (such as those described above with respect to FIG. 6).

Time constraint logic 718 is operable to, for example, ensure that data is consistent with whatever time constraints are in effect for particular data records, particularly as part of an insert, delete, or modify operation on a data record(s). The time constraint logic 718 contains, for example, a resolver 720 that is used to resolve inconsistencies related to records that are subject to time constraint 1. The resolver 720 is discussed in more detail below.

Finally in FIG. 7, the grouping reader 402 is shown to contain a grouping value optimizer 722. The grouping value optimizer has several functions. For example, it may fill gaps that exist between the lowest date to the first grouping by, for example, setting records to "not grouped" or extending the first time slot down to the lowest date (depending on how default grouping rules are set up). The optimizer 722 also may fill other gaps with "not grouped." Furthermore, the optimizer 722 is operable to optimize splits by removing unnecessary splits in grouping values while not affecting purposely-induced splits created during the grouping process. Finally, the optimizer 722 will create such induced splits, if needed.

Figure 8:
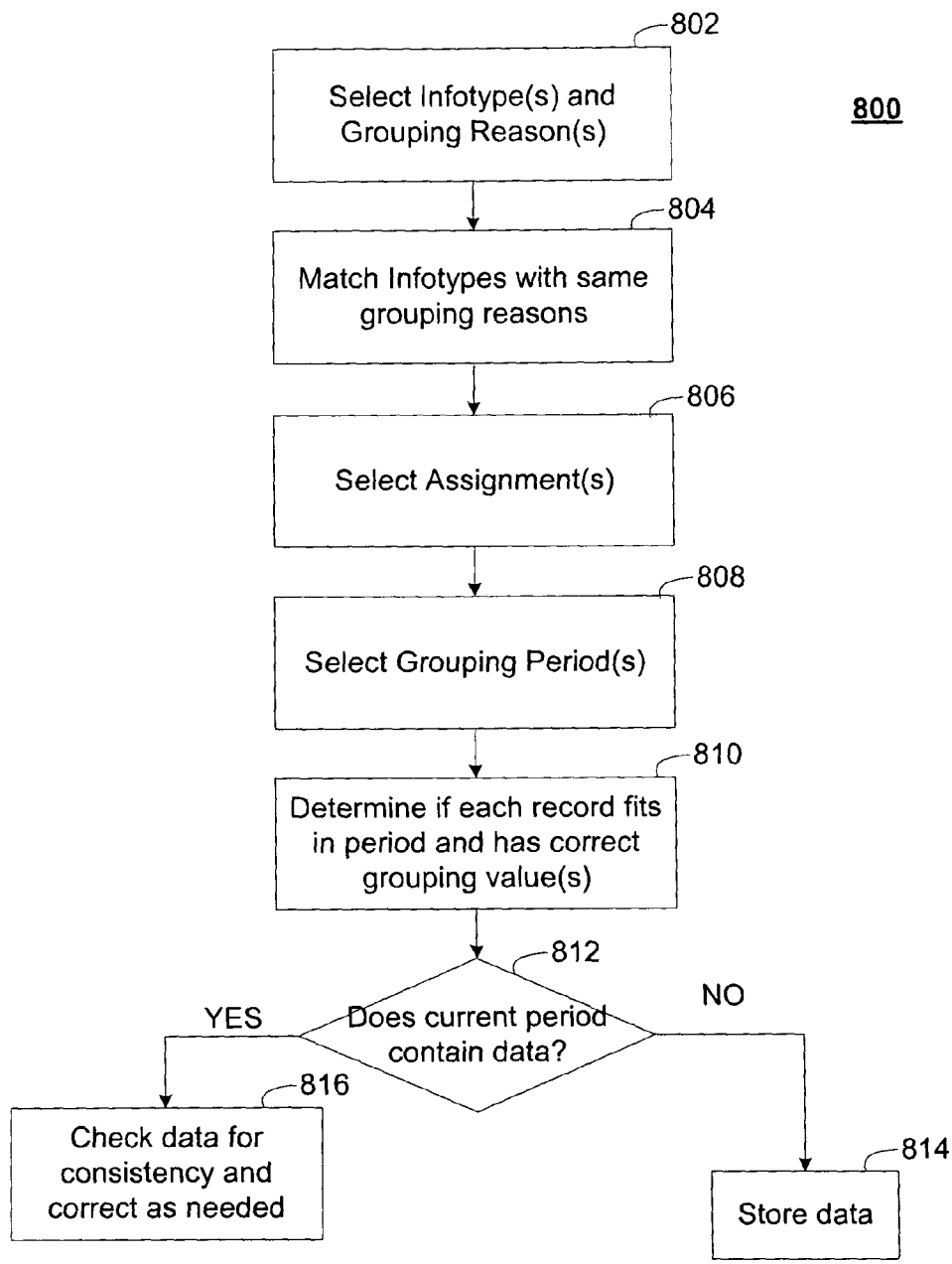
FIG. 8 is a flowchart illustrating operations of the consistency checker of FIG. 7.

FIG. 8 is a flowchart 800 illustrating operations of the consistency checker 714 of FIG. 7. In FIG. 8, the consistency checker 714 operates by selecting Infotypes and grouping reasons for processing (802). It should be understood that if the Infotypes include subtypes, then the subtypes may be used.

The consistency checker 714 then determines Infotypes that match each grouping reason (or default grouping) (804), and, for each grouping reason, recursively checks each assignment (806) and grouping period (808) to determine whether each record fits into each period and has a correct grouping value (810). Before or during these operations, the grouping value optimizer 722 may be used to ensure that any unnecessary splits in grouping values are removed.

If a current period being checked does not contain data (812), then the data is stored in that period accordingly (814). If the period already contains data (812), then the data is compared with the data being checked for consistency (816), and corrected if necessary.

In performing the above-described processes, the assignments and grouping periods may be checked in order. For example, the assignments may be selected/checked in numerical order according to their corresponding assignment identification numbers, and the grouping periods may be checked from a low date to a high date. In this way, currently-selected assignments and grouping periods may be compared to already-selected (and verified) assignments and grouping periods.

Figure 9:
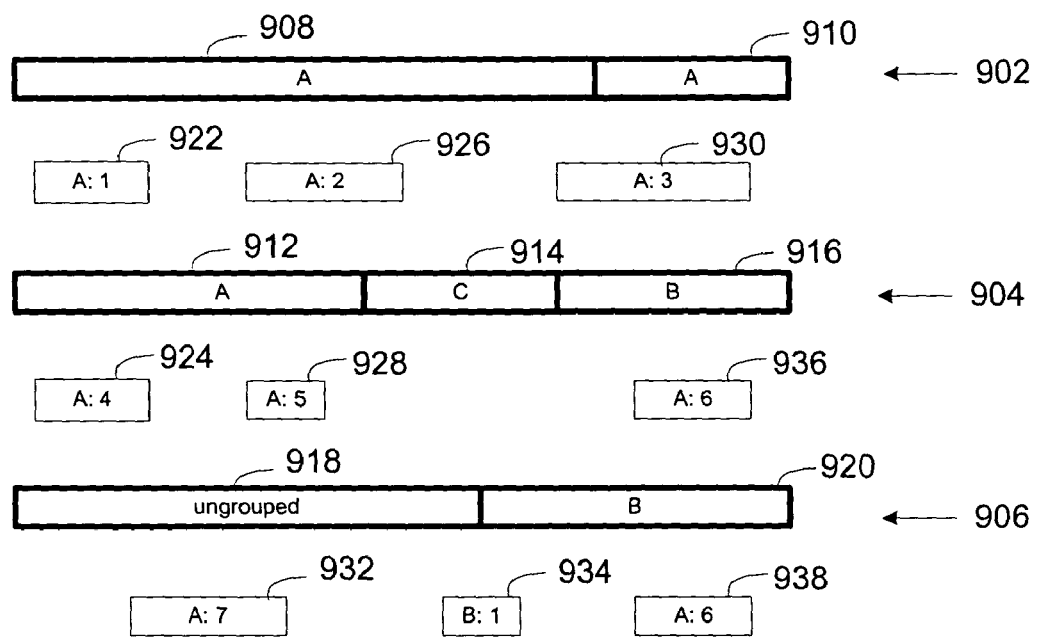
FIG. 9 is a block diagram of timelines illustrating grouping inconsistencies that may be encountered and corrected by the consistency checker of FIG. 7.

FIG. 9 is a block diagram of timelines illustrating grouping inconsistencies that may be encountered and corrected by the consistency checker 714 of FIG. 7. Specifically, FIG. 9 illustrates a timeline 902, a timeline 904, and a timeline 906.

The timeline 902 includes a first grouping period 908 and a second grouping period 910, both of which have a grouping value "A." Note that an unnecessary split exists between the grouping periods 908 and 910; that is, there is no reason for the split since the grouping value does not change. Such a split, as mentioned above, may be removed by the optimizer 722.

The timeline 904 includes a first grouping period 912 have the grouping value "A," a second grouping period 914 having a grouping value "C," and a third grouping period 916 having a grouping value "B." The timeline 906 has a first grouping period 918 with a grouping value "ungrouped," and a second grouping period 920 with the grouping value "B."

In FIG. 9, records 922 and 924 exhibit a first type of inconsistency, where grouping values (A) of each record match, but the content (illustrated as "1" and "4" respectively) of the records do not match. A record 926 exhibits another inconsistency type, where the grouping value (A) is correct for a portion of the record, but a split is missing in the record 926 that would correspond to the split between grouping periods 912 and 914 of the timeline 904. Additionally, the content ("2") is not reflected in a corresponding record 928 of the grouping period 912, as it should be given that the grouping values of periods 908 and 912 are the same (A).

A record 930 would be considered acceptable, because its content and grouping value are not inconsistent with any other record or grouping period. On the other hand, a record 932 is incorrect, since its grouping value should be "ungrouped" instead of "A." Further, a record 934 is incorrect, since it is missing a split corresponding to the change in grouping values of the timeline 906 from "ungrouped" to "B."

Finally, records 936 and 938 are inconsistent, even though they have the same grouping value ("A") and the same content ("6"). This is because the records 936 and 938 do not match the actual grouping value ("B") assigned to their respective grouping periods 916 and 920.

As explained above, the above-described operations of the grouping reader 402 and the consistency checker 714 represent grouping operations to ensure accurate assignment and use of grouping values to ensure proper sharing of data across multiple assignments. For example, an employee may have several assignments, and some (or all) data records associated with one of the assignments may be synchronized with corresponding data records in one or more of the other assignments.

It should be understood that values of such records may change over time, and synchronization will have to be (re-)performed accordingly. For example, it may be the case that an employee's name changes due to marriage, or a bank account (or bank account number) associated with an employee is altered. Additionally, a mistake may be discovered in a database system, such that a previously-entered record may need to be modified or deleted.

Such database modifications would not generally affect the assigned grouping values. Rather, the system would operate to ensure that the records match the assigned grouping values, and one another, so as to reflect any changes or corrections entered into the database. However, other types of events may, in fact, affect the grouping values themselves. In such cases, the re-grouping engine 716 may be used to amend the database system accordingly.

One such example of changes to grouping values is the situation where records are grouped according to employer, and organizational changes of the larger corporate entity cause changes to one or more of the employers in question. For example, in FIG. 3, the person 302 has three employers, Hospitals A, B, and C. As explained, each of these hospitals may be part of a larger healthcare provider having a common database system(s), which creates the need for the various data-sharing techniques discussed herein. Over time, this healthcare provider may group Hospitals A and B into a single corporate entity or subsidiary, or may split one or more of the hospitals into two or more additional subsidiaries.

When records of an employee for such a re-categorized employer have a grouping reason "employer," then new grouping values will need to be assigned by the grouping editor 404. As a result, new splits in records or grouping values may be required, and records may need to be copied or deleted. In this way, the re-grouping engine 716 re-groups the database records to reflect the, in this case, organizational change. In this process of re-grouping, the re-grouping engine 716 may work with the consistency checker 714 to ensure that the new grouping is consistent, in the manner already explained above.

Figure 10:
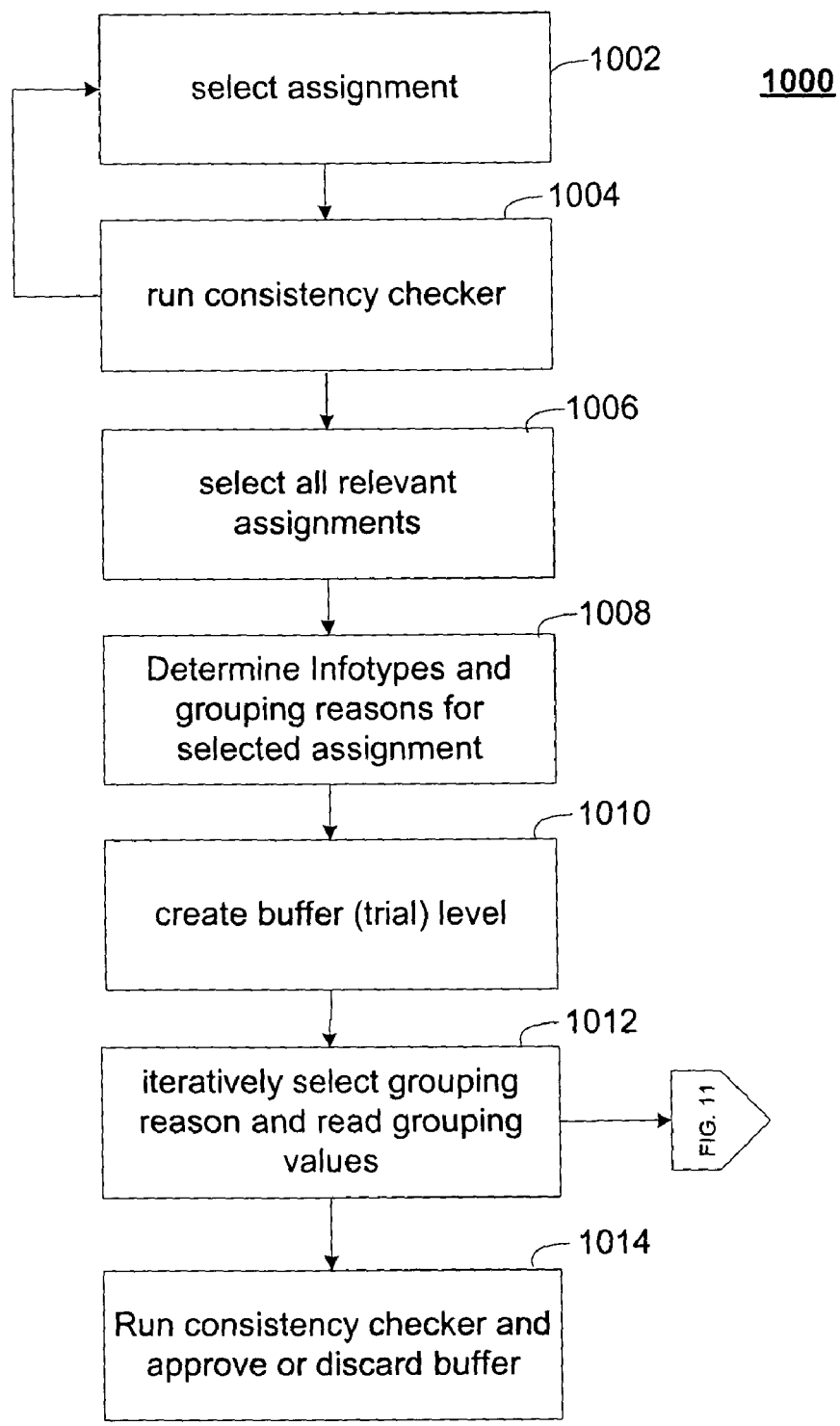
FIG. 10 is a flowchart illustrating an operation of the re-grouping engine of FIG. 7.

FIG. 10 is a flowchart 1000 illustrating an operation of the re-grouping engine 716 of FIG. 7. In FIG. 10, the re-grouping engine 716 begins operation by selecting an assignment associated with an employee to be re-grouped (1002). The re-grouping engine 716 then runs the consistency checker 714 as described above (1004), to determine whether the selected assignment has remained consistent through the grouping change. If so, the re-grouping engine 716 may select another assignment or end.

Otherwise, the re-grouping engine 716 may select all relevant assignments (1006), i.e., all assignments connected to the employee in question, and then determine Infotypes (subtypes) and grouping reasons for that assignment (1008). The re-grouping engine 716 may create a buffer or trial level (1010) to hold grouping values to be checked.

Then, the re-grouping engine 716 iteratively selects grouping reasons and reads the corresponding grouping values (1012). This process is described in more detail in FIG. 11. Once grouping values for the selected assignment have been read, the consistency checker 714 may be run so as to either approve or discard the created buffer (1014). Thereafter, the process may be repeated for each assignment, until re-grouping is complete.

Figure 11:
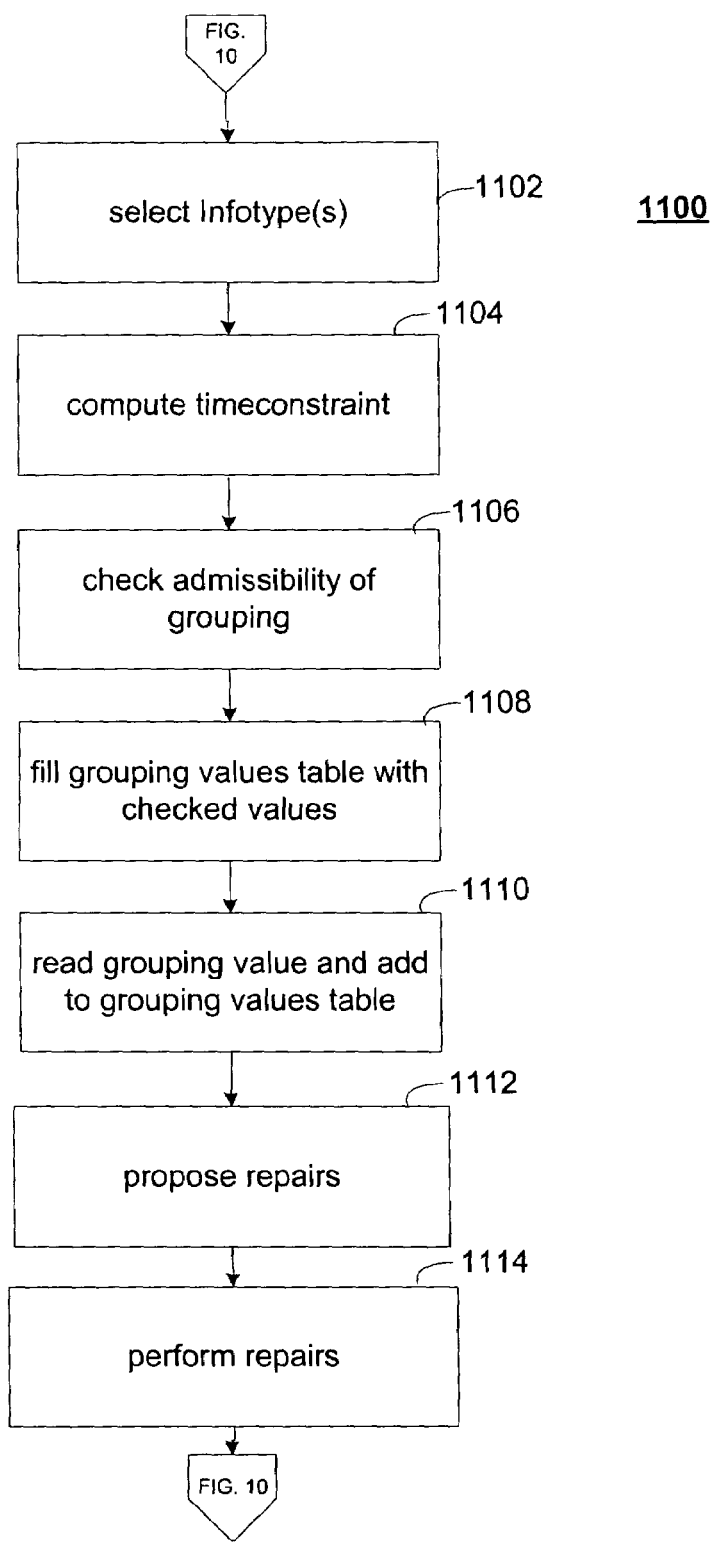
FIG. 11 is a flowchart illustrating the process of reading grouping values during the re-grouping operation of FIG. 10.

FIG. 11 is a flowchart 1100 illustrating the process of reading grouping values during the re-grouping operation of FIG. 10. In FIG. 11, an Infotype (subtype) of the selected assignment is selected for processing (1102). A time constraint associated with the Infotype is computed (1104), and admissibility of grouping is checked accordingly (1106). For example, as mentioned above, time-dependent (split) grouping may not be used with time constraint A or B. These functions may be performed by the time constraint logic 718 of FIG. 7.

Next, a table, such as the grouping values table 706 of FIG. 7, is filled with grouping values, if any, that have already been read and checked for consistency (1108). The re-grouping engine calls the grouping reader 402 to read the grouping value(s) of the selected Infotype, and adds this grouping value to the table (1110). Then, by comparing the current assignment/Infotype with the entries in the table, any necessary repairs may be proposed (1112) and performed (1114).

Figure 12A:
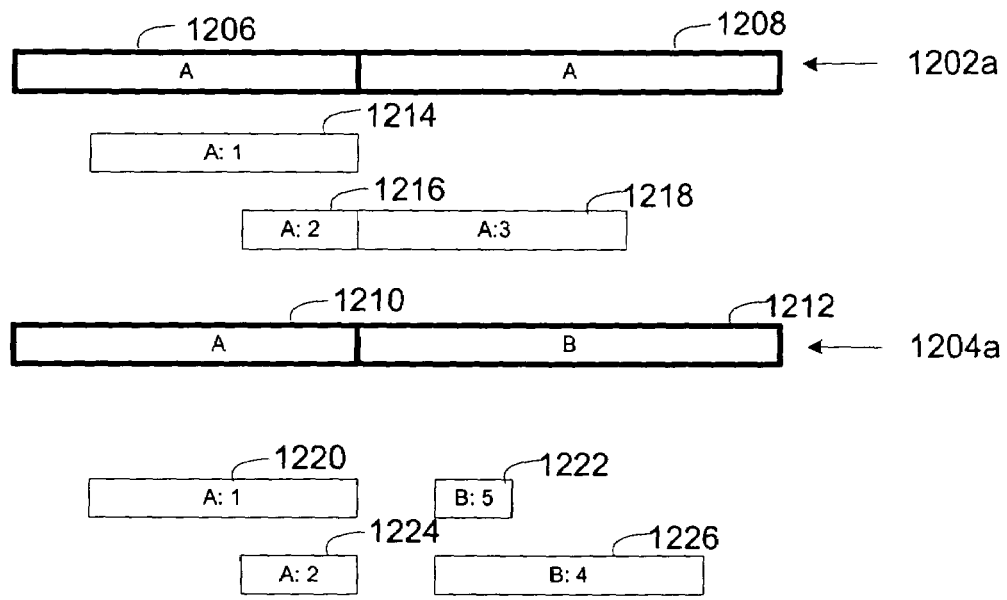
FIGS. 12A and 12B are block diagrams illustrating timelines undergoing a re-grouping process.
Figure 12B:
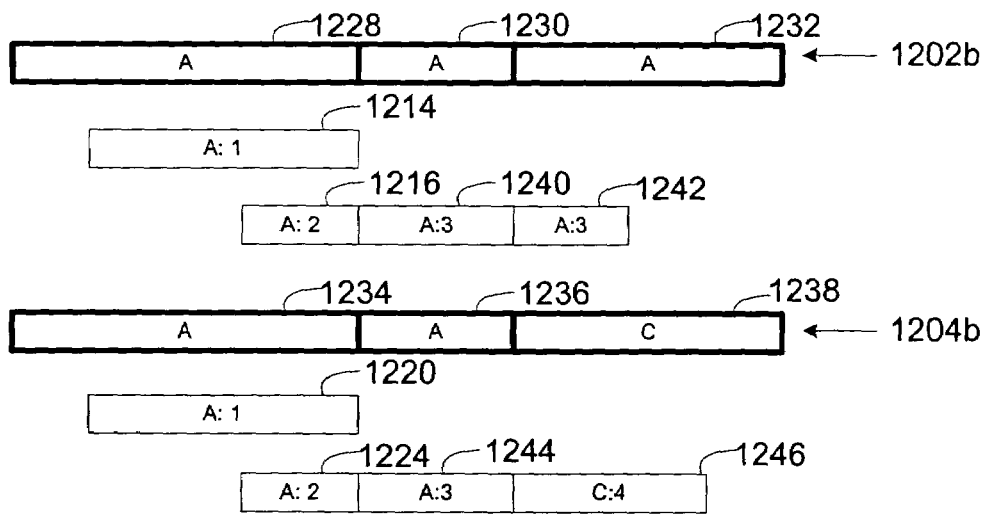

FIGS. 12A and 12B are block diagrams illustrating timelines undergoing a re-grouping process. Specifically, FIG. 12A illustrates a first timeline 1202a and a second timeline 1204a, which are re-grouped to form a timeline 1202b and 1204b, respectively.

The timeline 1202a includes a first grouping period 1206 having a grouping value "A," and a second grouping period 1208 that also has a grouping value "A." The timeline 1204a includes a first grouping period 1210 having a grouping value "A," and a second grouping period 1212 that has a grouping value "B."

The timeline 1202a includes a record 1214, a record 1216, and a record 1218, having values shown as "1," "2," and "3," respectively. Note that the record 1214 is shown in a separate timeline than the records 1216 and 1218, which may represent, for example, two subtypes of the same Infotype. Similarly, the timeline 1204a has records 1220, 1222, 1224, and 1226, which have values shown as "1," "5," "2," and "4," respectively. It should be understood from FIG. 12A that the various timelines and records shown therein have been grouped by the grouping reader 402 and checked for consistency by the consistency checker 714.

The timeline 1202b has grouping periods 1228, 1230, and 1232, all of which have grouping value "A." The timeline 1204b has grouping periods 1234 and 1236 having the grouping value "A," and a period 1238 having a grouping value "C." It should be understood that the unnecessary splits in timelines 1202a, 1202b, and 1204b between consecutive periods having grouping value "A" are added during the re-grouping process, but may be removed by the grouping values optimizer, perhaps during or after performance of the consistency check(s).

It should be understood from considering FIGS. 12A and 12B that a grouping values change occurs when the period 1210 of timeline 1204a is extended to the periods 1234 and 1236 of timeline 1204b, and a portion of the period 1212 becomes the period 1236 and the period 1238. As a result, the various records shown in FIG. 12A must be re-grouped accordingly.

Specifically, a record 1214 of the timeline 1202a is maintained in the timeline 1202b, as is the record 1216. The record 1218 is essentially maintained, but is split into two records 1240 and 1242 having the same value. Meanwhile, the record 1220 and 1224 are maintained, while the record 1222 is deleted. The record 1240 is copied as a record 1244, and the record 1226 is copied as a record 1246.

As discussed above with respect to FIG. 11, the re-grouping process may require corrections/changes to an assignment and its grouping. Specifically, repairs are first proposed (1112), and are then performed (1114).

Figure 13:
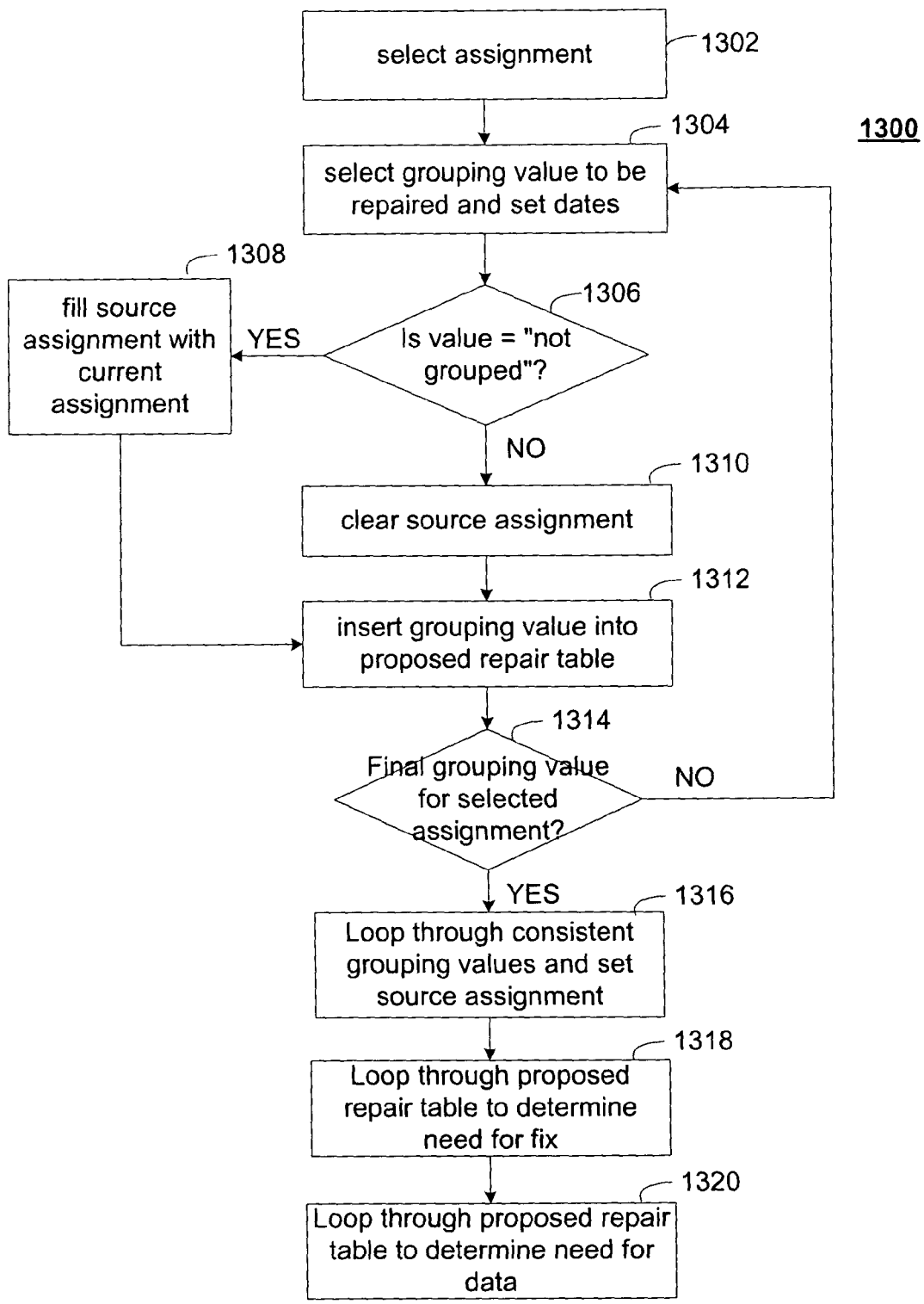
FIG. 13 is a flowchart illustrating techniques for proposing repairs of assignment groupings.

FIG. 13 is a flowchart 1300 illustrating techniques for proposing repairs of assignment groupings. In FIG. 13, a result of the repair proposal is a "proposed repair table," which identifies, for example, relevant time (grouping) periods and group values. The proposed repair table also may indicate whether a group value repair is needed (i.e., at least one record with an incorrect grouping value), and, if so, whether additional data is needed, and, if so, a source from which the additional data should be obtained. In other words, a table is formed having, for example, the following columns, shown in Table 1:

TABLE 1

| Beginning Date of Period | Ending Date of Period | Grouping Value | Needs Grouping Value Fix? | Needs Data? | Source Assignment |
|---|---|---|---|---|---|

In FIG. 13, then, operations begin by selecting an assignment with grouping values to be repaired (1302). Then, for the assignment, a grouping value to be repaired is selected and the beginning/end dates of the corresponding grouping period are set (1304).

If the value of the grouping value is not grouped (1306), then the source assignment column in Table 1 (i.e., in the proposed repair table) is defined as (filled with) the currently-selected assignment (1308). Otherwise, the source assignment column is cleared (1310).

Afterwards, the grouping value is inserted into the appropriate column of the proposed repair table (1312). If this is not the final grouping value for the selected assignment (1314), then the next grouping value is selected (1304).

If this is the final grouping value (1314), then the grouping values from the grouping values table are individually checked to set the source assignment column (1316). More specifically, it should be understood from the discussion above that the grouping values table in this operation is assumed to contain grouping values of assignments that have already been found to be consistent. Thus, by comparing these values and their respective periods to the periods/values already determined (i.e., 1302-1312), an assignment may be identified and selected that has matching data (assuming the grouping value "not grouped" is not considered as part of this process, since, by definition, it will not match any other group).

It should be understood that at this point, the source assignment column of Table 1 (the proposed repair table) contains useful information. Specifically, if the value of this column matches the selected assignment, then, as described above, the grouping value for the selected assignment must be "not grouped." If this column is empty, then it may be assumed that the assignment has a valid grouping, and is only not grouped because there happen to be no other matching assignments (records) with this grouping value. Finally, if the column identifies a source assignment, then it may be assumed that there is at least one other assignment (record) with a matching grouping value.

At this point all columns of the proposed repair table are full except for "needs grouping value fix?" and "needs data?" The first of these columns is filled by looping through the proposed repair table (i.e., checking each period) to see if all records match the grouping value for the given period (1318). If so, the "needs grouping value fix?" column may be set to false, otherwise, it may be set to true.

Also by looping through the proposed repair table, the various source assignments in that column may be checked to set the "needs data?" column (1320). Specifically, if the source assignment equals the current assignment (i.e., grouping value is "not grouped," as just discussed), or if the source assignment is empty (i.e., the grouping value is set but has no matching records), then the "needs data?" column may be set to False. If the source assignment is defined, then data for that source assignment is read for the relevant period. If the data matches the data for the assignment being repaired, the "needs data?" column is again set to False. Otherwise, the "needs data?" column is set to True.

Figure 14:
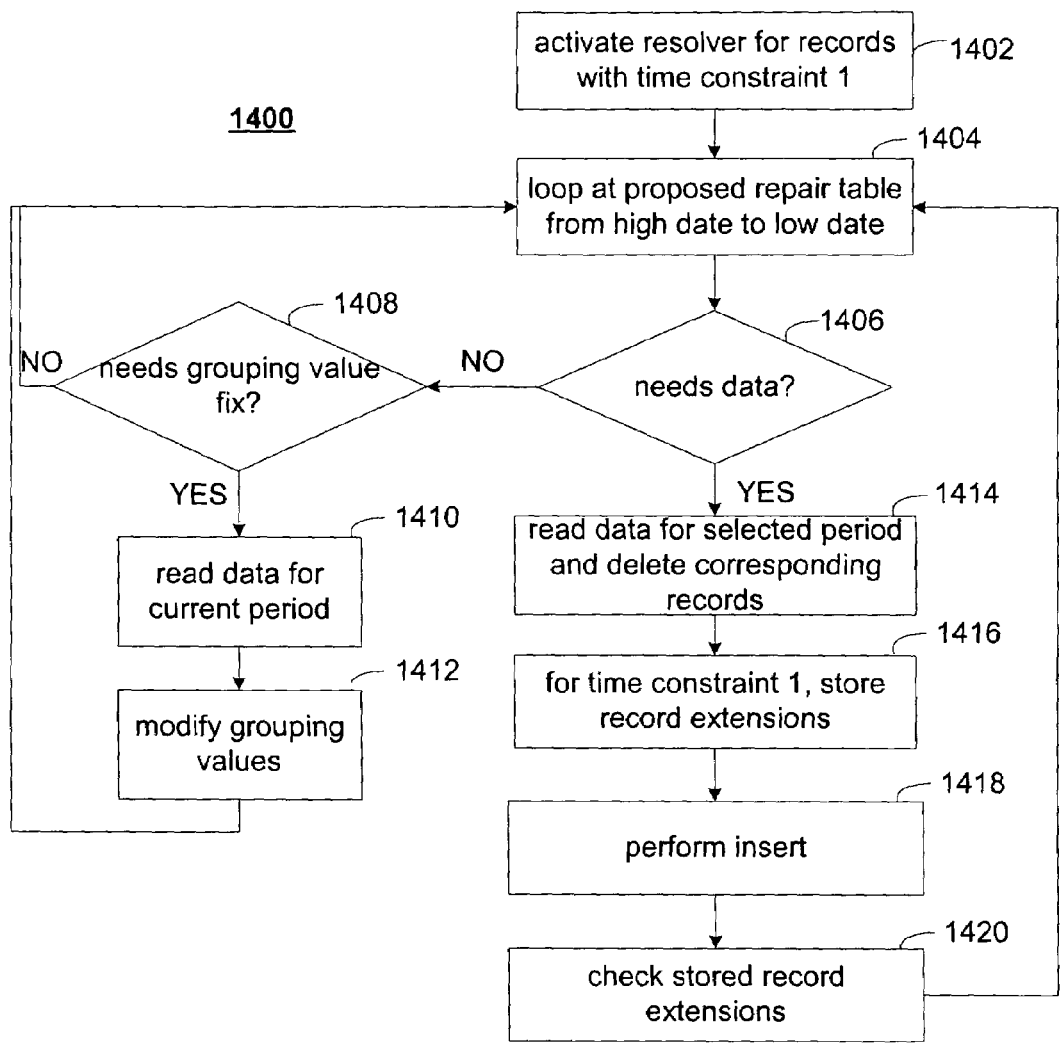
FIG. 14 is a flowchart illustrating techniques for performing repairs of assignment groupings.

FIG. 14 is a flowchart 1400 illustrating techniques for performing repairs of assignment groupings. In many cases performance of modifications, including repairs, is straightforward. However, certain situations may prove to be problematic. For example, a repair or other operation may require deleting of a record, which, in turn, may result in a gap in a timeline.

In the case of, for example, time constraint 2, such a gap may not be problematic, and simply reflects a lack of data during this time period. However, for time constraint 1, by definition there must be no such gaps in a timeline(s). To avoid gaps, then, a solution may be to extend a preceding record(s) in time to fill the gap(s), or to copy grouped data from a corresponding time period.

For example, a timeline may include a first data record containing bank account information of an employee, which may be changed by a data entry technician at a certain point in time to a second data record including new bank account information. If this change is later determined to be a mistake, then the second data record may be deleted. If bank account information is subject to time constraint 1 in the relevant database system, then the first record will be extended through the validity period of the deleted second record.

However, as seen below, such solutions are not always available and/or easily implemented. Also, even if such a solution is available to correct the gap in question, the solution may have unfortunate consequences. For example, extending a record to fill a gap may require copying of the extended record to another timeline. Such action may start a chain reaction of operations, and lead to a recursive processing of some or all already-processed data.

Techniques for processing records subject to time constraint 1 are discussed in more detail below. FIG. 14 illustrates techniques for performing non-problematic repairs, and for recognizing (potentially) problematic repairs (e.g., certain repairs involving records subject to time constraint 1) for assignment to modules that are specially-designed for this function (and discussed in more detail below).

Specifically, the process begins by activating the resolver 720 for records, if any, subject to time constraint 1 (1402). Then, the process loops through the proposed repair table formulated above, starting with a highest date and moving towards the lowest date (1404). It should be understood that this sequence may be necessary for time constraint 1, but would not be critical for situations where time constraint 1 was not an issue.

If the "needs data?" column of the proposed repair table is False (1406), then the "needs grouping value fix" column is checked (1408). If no grouping value fix is required, then the process moves to the next time period to be checked (1404). Otherwise, data is read for the current time period (1410), and grouping values are modified as needed (1412). The grouping value modifications may be performed, in this case, by the time constraint logic 718.

If the "needs data?" column is True (1406), then data is read for the selected period and the corresponding records are deleted (since they are being corrected) (1414). Techniques for performing the deleted functionality are discussed in more detail below. It should be understood from the above discussion, however, that deleting records that are subject to time constraint 1 may result in extensions of previous records. In the present process, such extensions are at least temporarily avoided, and gaps are left open for the resolver 720 to resolve.

Therefore, for records subject to time constraint 1, the time constraint logic 718 checks for inadvertent record extensions, for example, by comparing a "begin date" of the ostensibly deleted records above to a "proposed repair begin date." If these values match, then the implication is that the previous record was improperly extended. The corresponding records are then stored separately (1416).

Subsequently, data is inserted from the source assignment, so as to result in correctly re-grouped records (1418). Techniques for performing an insert operation are discussed in more detail below. In this context, however, it should be understood that if the insert for the record being considered would result in a gap, then (for time constraint 1), the insert operation may be delegated to the resolver 720.

In performing the insert, the database primary key of the record to be corrected is changed to reflect the appropriate source assignment (i.e., the one designated in the "source assignment" column of the proposed repair table), and an insert method of the time constraint logic 718 is called to insert a copy of the relevant data.

Finally, the improperly-extended records stored previously (1416) are considered (1420). Specifically, records in which the begin data still matched a proposed repair begin date are disregarded. In such a situation, it may be assumed that, even though the records were improperly extended, they were subsequently overwritten during the copy process (1418). Any remaining stored records are assigned to the resolver 720.

Figure 15:
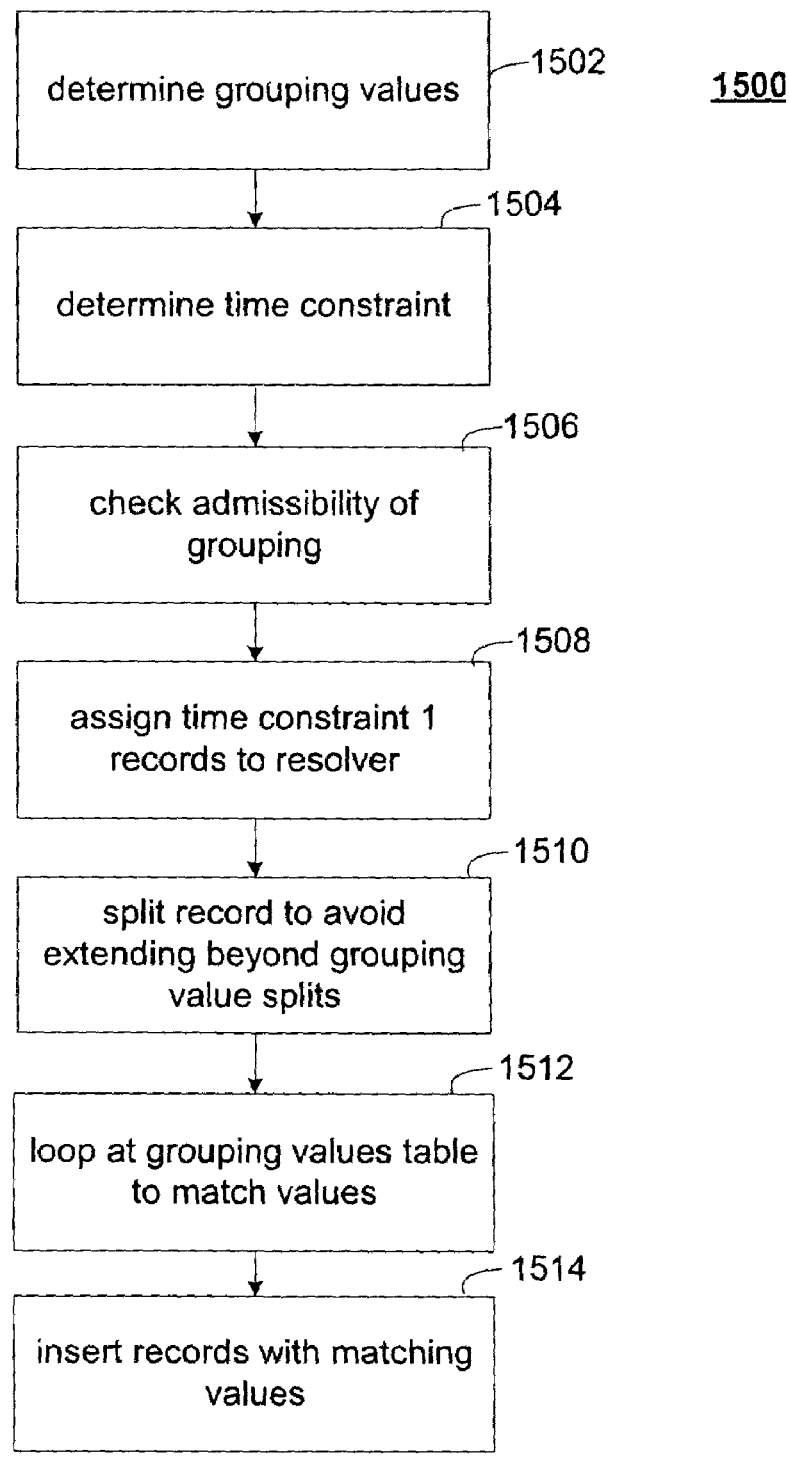
FIG. 15 is a flowchart illustrating an insert process for inserting data records.

FIG. 15 is a flowchart 1500 illustrating an insert process for inserting data records. In FIG. 15, the process assumes that grouping is current consistent (or calls the consistency checker 714 to be sure). The grouping values (1502) and time constraint (1504) of the record to be inserted are checked, and the admissibility of the grouping values is also checked (1506). Records subject to time constraint 1 are assigned to the resolver 720 (1508). Other records are split so as to avoid extensions that go beyond existing grouping value splits (1510).

Then, the process loops through the split records at the grouping values table to find matching grouping values (excluding "ungrouped" values) (1512). Then, (split) records with matching grouping values are inserted (1514). The consistency checker 714 may then be run to ensure consistency.

Figure 16A:
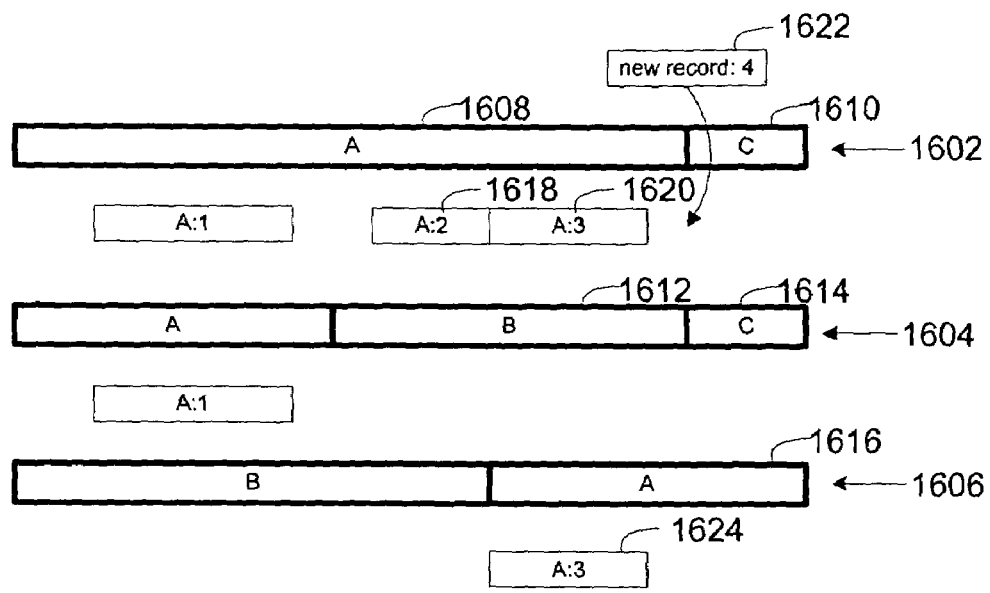
FIGS. 16A and 16B are block diagrams illustrating an insert process of the flowchart of FIG. 15.
Figure 16B:
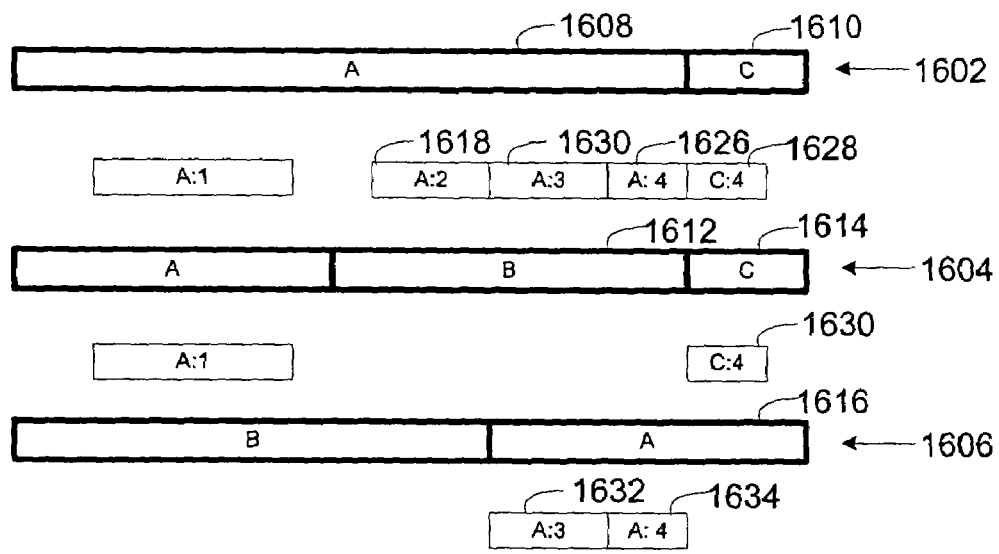

FIGS. 16A and 16B are block diagrams illustrating an insert process. It should be understood that such an insert process may be used, for example, simply to insert new data. The insert process also may be used during the re-grouping process, e.g., during the perform repairs process of the flowchart 1400 of FIG. 14.

FIGS. 16A and 16B illustrate timelines 1602, 1604, and 1606. The timeline 1602 includes a grouping period 1608 and a grouping period 1610. The timeline 1604 includes, in pertinent part, a grouping period 1612 and a grouping period 1614. Finally, the timeline 1606 includes a grouping period 1616.

The timeline 1602 includes, in pertinent part, a record 1618 and a record 1620. In FIG. 16A, as shown, a new record 1622 is to be inserted. Finally with respect to FIG. 16A, a record 1624 reflects data sharing of the record 1620.

In FIG. 16B, the record 1622 has been split and inserted as a record 1626 and a record 1628. This split reflects the change in grouping values between the periods 1608 and 1610. Further, the records 1620/1624 are de-limited/truncated into the respective records 1630/1632. It should be understood that problems caused by these operations, if any, should be caught by operation of the consistency checker 714.

Figure 17:
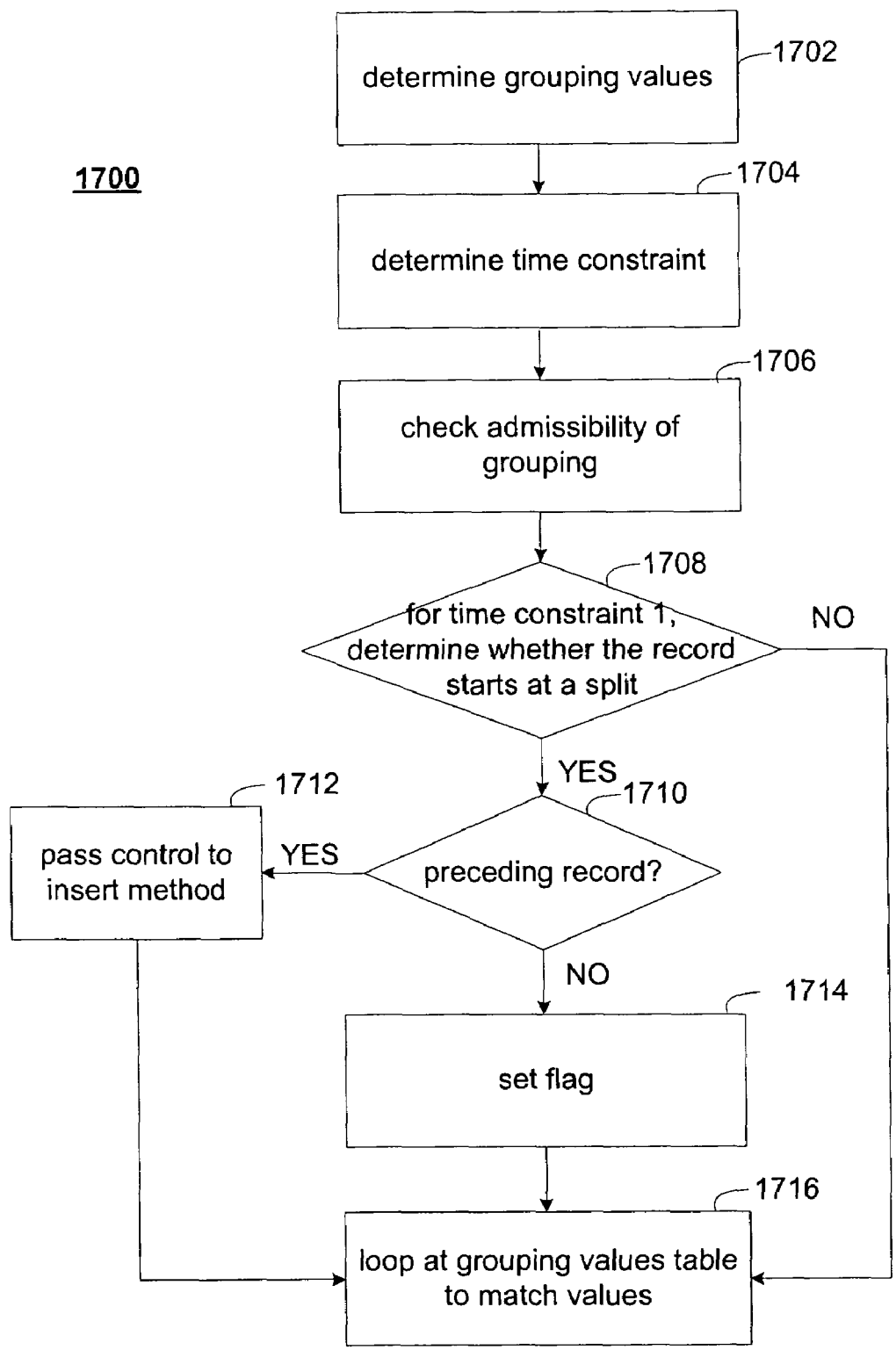
FIG. 17 is a flowchart of a delete process.

FIG. 17 is a flowchart 1700 of a delete process. As in FIG. 15, the process begins by determining grouping values (1702), time constraints (1704), and admissibility of grouping (1706). For records having time constraints other than time constraint 1, a simple delete follows.

For time constraint 1, it is determined whether the record to be deleted begins at a grouping value split (that is, has a begin date that coincides with a begin data of the grouping value period) (1708). If so, then it is determined whether a preceding record exists (1710). If so, then the preceding record is inserted into the period being checked by way of the insert method(s) described above (1712).

Otherwise, if no preceding record exists, a flag is set that will give an error message if the delete operation would cause inconsistencies (described in more detail below) (1714). Finally, as in the insert method(s) above, the process loops through the grouping values table to ensure that the new record set has correct grouping values (1716), which may be double-checked by the consistency checker 714.

Figure 18A:
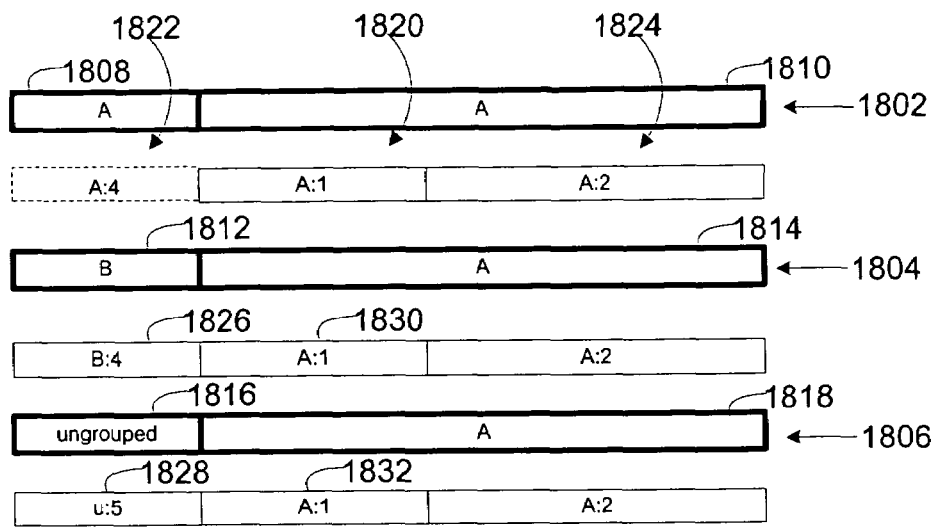
FIGS. 18A and 18B are block diagrams illustrating a delete process.
Figure 18B:
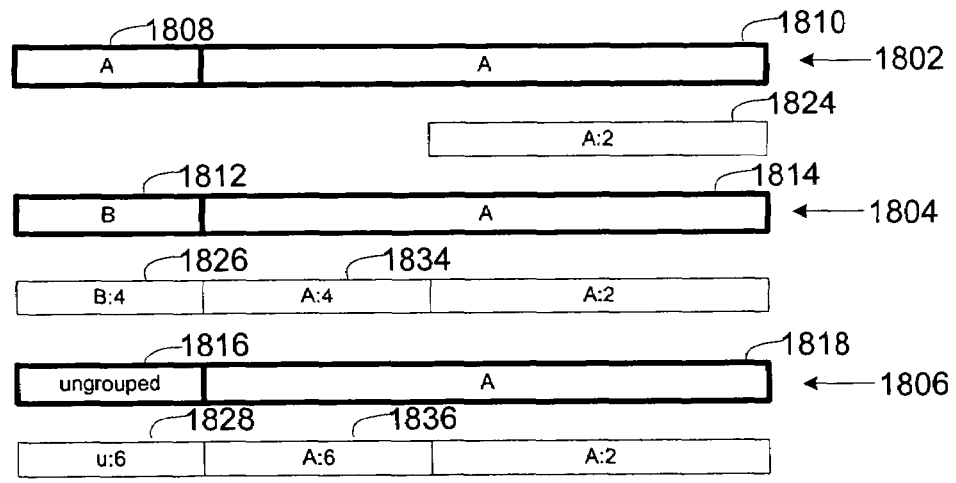

FIGS. 18A and 18B are block diagrams illustrating a delete process. FIGS. 18A and 18B illustrate timelines 1802, 1804, and 1806. The timeline 1802 includes a grouping period 1808 and a grouping period 1810. The timeline 1804 includes a grouping period 1812 and a grouping period 1814. Finally, the timeline 1806 includes a grouping period 1816 and a grouping period 1818.

The timeline 1802 includes a record 1820. In one scenario discussed below, the timeline 1802 includes a record 1822 (illustrated with a dashed line). In another scenario discussed below, a case where no record precedes the record 1820 is discussed. In either case, a record 1824 also is included in this sequence of records. In FIG. 18A, the timelines 1804 and 1806 include records 1826 and 1828, respectively, which, also respectively, are followed by records 1830 and 1832.

In FIG. 18B, the effect of deleting the record 1820 is discussed. In the case where the record 1822 exists, deletion of the record 1820 would result in the record 1822 (with value:content=A:4) being extended through to the beginning of the record 1824. In this case, because of matching grouping values, records 1830 and 1832 would be copied to contain A:4 as well.

However, it may be the case that no such record 1822 exists. For example, perhaps the employee in question was assigned to an employer associated with the grouping value "A" of timeline 1802, but had not begun work. In this case, as shown in FIG. 16B, the record 1826 would be extended as a record 1834, while a record 1828 would be extended as a record 1836. The grouping values of the records 1834 and 1836 are adjusted (to "A") to reflect their new grouping status. However, it is not clear whether or how one of these records should be changed to reflect the other, and/or whether/how one of these records should be copied into the space left empty by the deletion of the record 1820.

Figure 19A:
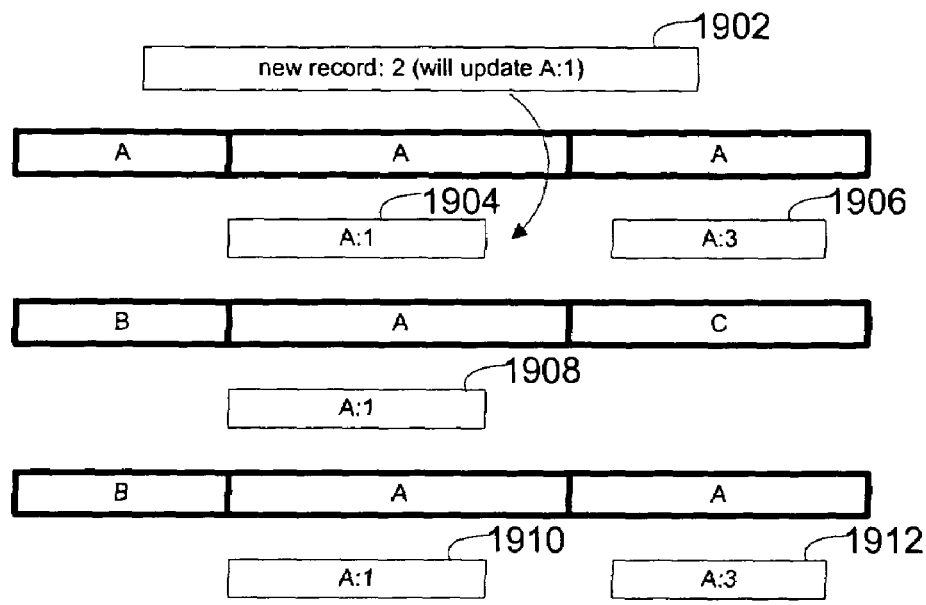
FIGS. 19A and 19B are block diagrams illustrating a modify process.
Figure 19B:
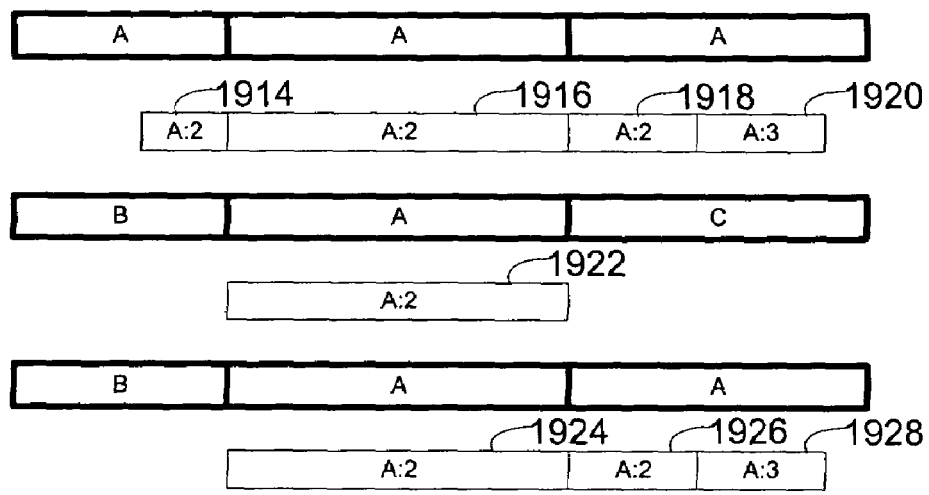

FIGS. 19A and 19B are block diagrams illustrating a modify process. In FIG. 19A, a record 1902 is to be included which will modify a record 1904. As seen below, this modification affects all of records 1906, 1908, 1910, and 1912.

Specifically, as shown in FIG. 19B, the record 1904 is deleted and the record 1902 is split into a record 1914, a record 1916, and a record 1918. Further, the record 1906 is delimited and leaves a record 1920.

Further, the record 1916 is copied as a record 1922 and a record 1924. Similarly, the records 1918 and 1920 are copied as record 1926 and 1928, respectively. The result in FIG. 19B is a consistent grouping of all timelines.

It should be understood from the above that the modifications of FIGS. 19A and 19B may be made using, or in conjunction with, the various techniques discussed herein. For example, the records 1914 and 1918 may be inserted using the insert methods described above (since they do not overlap with the previous record 1904), while the record 1916 may be created as an update (due to its overlap with the record 1904).

When modification includes only changes to data, it may be fairly straight-forward. In cases where a key of the record to be modified is also modified, then, as seen in the context of the insert methods above, unanticipated splits may result. Such events may be considered using similar techniques to those discussed above with respect to the insert techniques.

The above-described techniques provide various techniques for computing dependencies between timeslots, so that data associated with those timeslots may be synchronized in a specified fashion across portions of a database system (for example, across selected ones of a plurality of work assignments. As pointed out above, these techniques are often straight-forward to implement in the context of time constraints other than time constraint 1.

The techniques also can be implemented when time constraint 1 is present. In some such cases, it may occur that the presence of time constraint 1 happens not to affect the data sharing. In other implementations, effects of time constraint 1 may be countered by manual updates or corrections to the database system, where feasible. Nonetheless, it often may be the case that even one operation on a record subject to time constraint 1 could lead to a chain reaction of recursive processing that may lead to a system slow down or stoppage.

As described, such difficulties generally arise from the fact that time constraint 1 requires that no gaps be present in associated timelines. Since the data sharing described herein is essentially an extension of, and operates in conjunction with, the time constraint logic, the gaps are eliminated by extending preceding records until the gaps are filled. When this situation is encountered, as described above, the resolver 720 may be used to compute dependencies between timeslots subject to time constraint 1, using the specialized techniques described below.

Figure 20A:
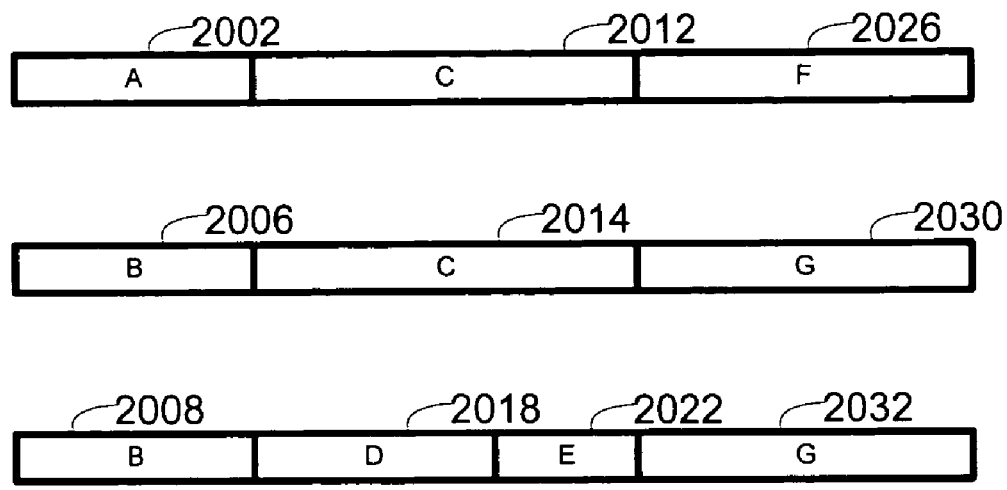
FIGS. 20A and 20B are block diagrams illustrating an isomorphism between timelines with grouping values and a directed graph.
Figure 20B:
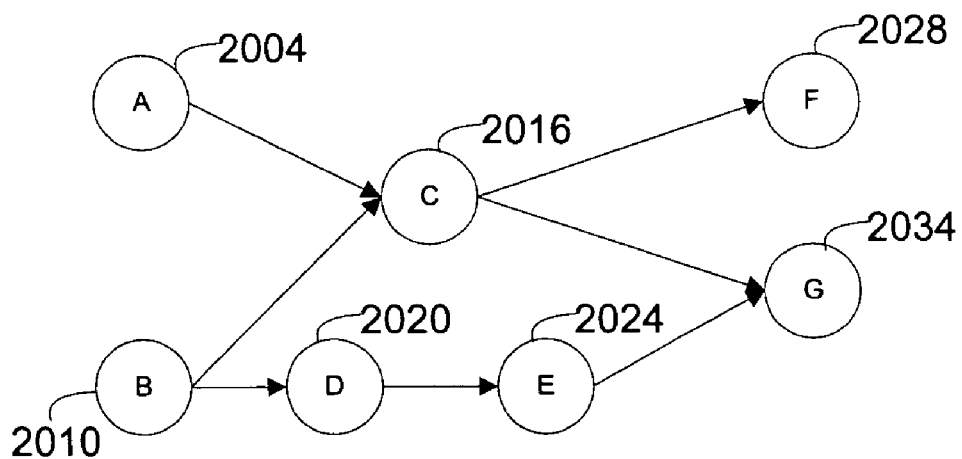

FIGS. 20A and 20B are block diagrams illustrating an isomorphism between timelines with grouping values and a directed graph. As described in more detail below, grouping values of FIG. 20A are mapped to a directed graph of FIG. 20B (which may be an acyclic directed graph, i.e., one in which no node is both a starting and an ending node for a path through the graph). Then, distributing data is considered to be a coloring problem for the directed graph. In this way, dependencies between timeslots subject to time constraint 1 may be easily and reliable computed.

The mapping between FIG. 20A and FIG. 20B proceeds by corresponding every period and grouping value to a corresponding node of the directed graph. Specifically, a period 2002 is mapped to a node 2004, while periods 2006 and 2008 are mapped to a node 2010. Periods 2012 are mapped to a node 2016, while a period 2018 is mapped to a node 2020. Similarly, a period 2022 is mapped to a node 2024, a period 2026 is mapped to a node 2028, and periods 2030 and 2032 are mapped to a node 2034.

If a period succeeds another period, a directed edge is inserted into the directed graph of FIG. 20B. In this way, nodes of the directed graph represent timeslots with equal data (e.g., the node 2016 represents timeslots 2012 and 2014). Edges of the directed graph represent the fact that data may be transferred from one period into another by means of the time constraint 1 extension mechanism.

By considering data to be a color, FIG. 20B illustrates that inserting data (a first color) into a grouping period(s) (node)

may be considered to be equivalent to coloring that node with the given color. Then, because of the extension mechanism, all succeeding nodes also are colored the same color (unless they already contain another color, i.e., other data).

In the simplest case, there is no data currently associated with the grouping periods/directed graph of FIGS. 20A and 20B. In this case, for example, coloring the node 2010 (i.e., inserting data into the period 2006/2008) would result in coloring nodes 2016, 2028, 2020, 2024, and 2034. Of course, if one of those nodes is already colored, then the coloring process started by coloring the node 2010 would stop at that node.

Thus, in practice, completely filled periods (i.e. colored nodes) are not critical, since they are not affected by the extension mechanism. In other words, nodes that are already colored will have all their successors also colored, and this will not change unless new data is inserted into one of the grouping periods. So, all fully-colored graphs (i.e., completely-filled periods) can be removed from the graph. In this case, it should be understood that nodes in the directed graph represents only periods with no data at "begin date."

It is not necessary to actually store the nodes to perform the above-described operations. Rather, all necessary information may be represented by storing the edges between the nodes. Specifically, the edges may be represented by a structure having the following fields: grouping value, begin date, assignment (i.e., assignment identifier), successive grouping value and successive begin date (i.e., grouping value and begin date of successive periods/nodes), and information related to a start node of the directed graph (i.e., whether the start node has data and the begin date of this node/data). Additionally, steps may be taken to avoid double processing in situations where a node may be reached by multiple edges.

In short, it should be understood that if a value is not grouped then it will have a single successor (for a given assignment), so that the edge may be determined by the grouping value, begin date of the period, and the assignment. If a value is grouped, then is may have multiple successors, since the node is a node for multiple assignments. As a result, an edge of the directed graph may be determined by node information in conjunction with successive node information (where the successive node information may be derived from the assignment(s) in question).

Figure 21:
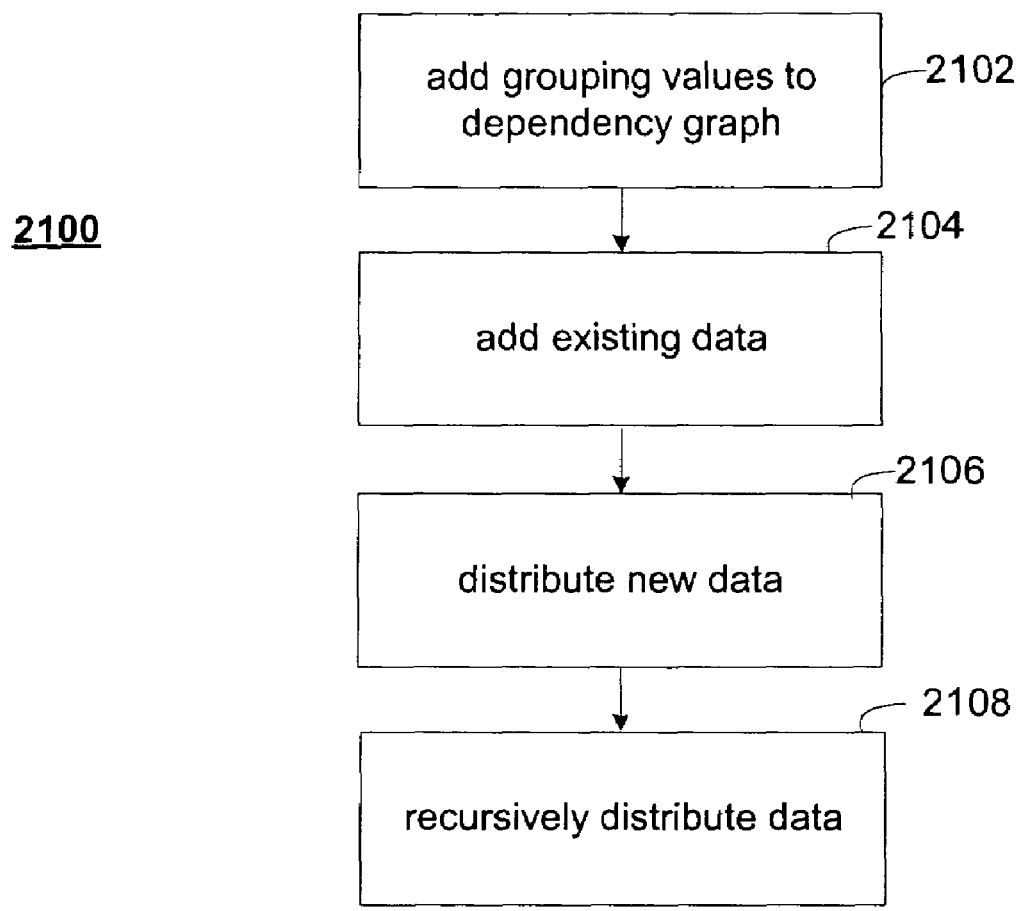
FIG. 21 is a flowchart illustrating techniques for computing dependencies between timeslots for time constraint 1.

FIG. 21 is a flowchart 2100 illustrating techniques for computing dependencies between timeslots for time constraint 1. In FIG. 21, imported grouping values are added to a dependency graph (2102). Then, data is added to the dependency graph (2104), that is, nodes of the graph are colored.

Then, new data is distributed along the directed graph structure (2106). That is, data added previously (2104) reflected existing data, while new data distributed here reflects new data to be added to the database. Finally, data is recursively distributed through the graph (grouping periods) (2108), taking into account the effects of time constraint 1.

The above description has provided techniques for synchronizing data across specified portions of a database. For example, data may be grouped according to a defined value, so that data associated with the value is identical wherever it appears in the database. Such a system, as described, may be useful in a concurrent employment situation in which an employee has multiple job assignments (employers) associated with a single database system. In such a case, some, but not all, of the data associated with the employee may be shared between the assignments.

In synchronizing data across a database as just described, time-dependent and time-constrained data may be synchronized. Also, the grouping value(s) itself may be time-dependent. In situations where time constraint 1 is involved, so that a timeline associated with data records exhibits no time gaps between the data records, the data may be mapped to a directed graph. In this way, any time gaps may be filled by extending data records that precede the gap(s), and this operation may be reflected in a coloring of the directed graph. Then, recursive processing may be performed using the directed graph, so as to consider any unanticipated effects of the extended data records.

Although the above techniques have been described for purposes of synchronizing data, it should be understood that the techniques have other uses as well. For example, the grouping values may be used to add different data together, rather than to synchronize data. For example, if an employee has multiple work assignments, hours worked at each assignment may be assigned the same grouping value and added together for the purposes of calculating overtime.

A number of implementations have been described. Nevertheless, it will be understood that various modifications may be made. Accordingly, other implementations are within the scope of the following claims.

What is claimed is:

1. A computer-implemented method comprising:
   translating grouping values into nodes of a directed graph, wherein the grouping values are associated with periods of timelines, the timelines comprising data records, and wherein a grouping value associated with a period of a first one of the timelines being the same as a grouping value associated with a concurrently occurring period of a second one of the timelines indicates that specified data of a data record for the period of the first one of the timelines is to be synchronized with the specified data of a data record for the period of the second one of the timelines;
   distributing data through the nodes to obtain a modified subset of the data records;
   re-distributing the data recursively along the nodes to obtain a modified directed graph;
   translating the modified directed graph into a modified plurality of timelines that include the modified subset of data records; and
   storing the modified plurality of timelines in a storage medium.

2. The method of claim 1, wherein the data records are subject to a time constraint such that temporal gaps between the data records are not allowed, and further wherein the modified subset of data records are in compliance with the time constraint.

3. The method of claim 1 comprising extending a data record preceding a temporary gap between data records caused by a modification of the data records through the temporary gap to a next-occurring data record.

4. The method of claim 1 wherein translating sequences of grouping values comprises:
   assigning identical grouping values to a single node; and
   inserting edges of the directed graph between pairs of nodes that correspond to consecutively-occurring ones of the periods.

5. The method of claim 4 comprising representing a node of the directed graph based on a grouping value and beginning point of an associated one of the periods.

6. The method of claim 1 wherein distributing data through the nodes comprises:
  assigning each grouping value and its associated period an assigned color; and
  coloring each node its assigned color to represent data, so that nodes having identical color share identical data.

7. The method of claim 1 wherein re-distributing the data comprises:
  associating data records of a first timeline and a second timeline from the plurality of timelines with a first grouping value; and
  synchronizing the data records.

8. The method of claim 1 wherein distributing data comprises removing a node from the directed graph that corresponds to a timeline period that is associated with a data record having data at its beginning.

9. The method of claim 1 wherein distributing data comprises:
  traversing the directed graph and designating consecutive nodes identically so as to represent identical data stored in association with the grouping values represented by the consecutive nodes; and
  stopping the traversing upon reaching a differently-designated node.

10. An apparatus comprising a storage medium having machine-executable instructions stored thereon, the instructions including:
  a first code segment, stored on the storage medium, for selecting a first grouping value sequence associated with a first timeline, the first timeline including first data records;
  a second code segment, stored on the storage medium, for selecting a second grouping value sequence associated with a second timeline, the second timeline including second data records, wherein the first data records and second data records are subject to a time constraint such that no gap is allowed between any two of the first data records and between any two of the second data records, and further wherein a grouping value associated with a period of the first timeline being the same as a grouping value associated with a concurrently occurring period of the second timeline indicates that specified data of a data record for the period of the first timeline is to be synchronized with the specified data of a data record for the period of the second timeline;
  a third code segment, stored on the storage medium, for mapping the first grouping value sequence and the second grouping value sequence into nodes of a directed graph;
  a fourth code segment, stored on the storage medium, for representing data associated with a first grouping value in the directed graph by providing a first designation to a first node associated with the first grouping value; and
  a fifth code segment, stored on the storage medium, for recursively distributing data through the directed graph in response to a modification of one of the first data records, beginning with a high date of the first timeline and the second timeline, to ensure that all of the first and second data records are in accordance with the time constraint.

11. The apparatus of claim 10 comprising a fifth code segment for extending a data record that precedes a gap in its associated timeline, in violation of the time constraint, until the data record meets a succeeding data record.

12. The apparatus of claim 10 comprising a sixth code segment for mapping the directed graph into a modified first timeline and a modified second timeline.

13. The apparatus of claim 10 wherein each grouping value is associated with a time period, and wherein identical data appears in the first timeline and the second timeline whenever a grouping value and period overlap.

14. The apparatus of claim 10 comprising:
  a sixth code segment, stored on the storage medium, for assigning identical grouping values to a single node of the directed graph; and
  a seventh code segment, stored on the storage medium, for inserting edges of the directed graph between pairs of nodes that correspond to consecutively-occurring ones of grouping values from the first grouping value sequence and the second grouping value sequence.

15. The apparatus of claim 10 comprising a sixth code segment, stored on the storage medium, for removing a node from the directed graph that corresponds to a timeline period that is associated with a data record having data at its beginning.

16. The apparatus of claim 10 comprising:
  a sixth code segment, stored on the storage medium, for traversing the directed graph and designating consecutive nodes identically so as to represent identical data stored in association with the grouping values represented by the consecutive nodes; and
  a seventh code segment, stored on the storage medium, for stopping the traversing upon reaching a differently-designated node.

17. A system comprising:
  means for associating, in an electronic database, nodes of a directed graph with grouping periods and grouping values associated with timelines, wherein a grouping value associated with a period of a first one of the timelines being the same as a grouping value associated with a concurrently occurring period of a second one of the timelines indicates that specified data of a data record for the period of the first one of the timelines is to be synchronized with the specified data of a data record for the period of the second one of the timelines;
  means for associating, in an electronic database, an edge of the directed graph between succeeding grouping periods;
  means for distributing data through the nodes to obtain a modified subset of the data records, re-distributing the data recursively along the nodes to obtain a modified directed graph, and translating the modified directed graph into a modified plurality of timelines that include the modified subset of data records; and
  means for storing the modified plurality of timelines in a storage medium.

18. The system of claim 17 wherein the timelines each comprises data records that are subject to a time constraint such that no temporal gap is allowed to exist between any two of the data records included in the respective timeline.

19. The system of claim 17 comprising means for designating nodes of the directed graph as corresponding to grouping periods containing data.

20. The system of claim 17 wherein a grouping period and a grouping value are associated with identical data of the timelines.

* * * * *